United States Patent
Yoshimuta et al.

(10) Patent No.: US 10,581,806 B2
(45) Date of Patent: Mar. 3, 2020

(54) SERVICE PROVIDING METHOD, SERVICE REQUESTING METHOD, INFORMATION PROCESSING DEVICE, AND CLIENT DEVICE

(71) Applicant: FUJITSU LIMITED, Kawasaki-shi, Kanagawa (JP)

(72) Inventors: Mamoru Yoshimuta, Ota (JP); Akio Shimono, Yokohama (JP); Naoki Miyoshi, Machida (JP); Shouhei Mizuno, Itabashi (JP)

(73) Assignee: FUJITSU LIMITED, Kawasaki (JP)

( * ) Notice: Subject to any disclaimer, the term of this patent is extended or adjusted under 35 U.S.C. 154(b) by 219 days.

(21) Appl. No.: 15/238,152

(22) Filed: Aug. 16, 2016

(65) Prior Publication Data
US 2016/0359846 A1    Dec. 8, 2016

Related U.S. Application Data

(63) Continuation of application No. PCT/JP2014/053618, filed on Feb. 17, 2014.

(51) Int. Cl.
*H04L 29/06* (2006.01)
*H04L 29/08* (2006.01)

(52) U.S. Cl.
CPC ...... *H04L 63/0428* (2013.01); *H04L 63/0853* (2013.01); *H04L 67/02* (2013.01); *H04L 67/146* (2013.01)

(58) Field of Classification Search
CPC .. H04L 63/0823; H04L 9/3263; H04L 9/3271
(Continued)

(56) References Cited

U.S. PATENT DOCUMENTS 6,161,139 A * 12/2000 Win ................. G06F 21/604
                                                   709/223
6,600,169 B2 *  7/2003 Stintz ................. B82Y 10/00
                                                    257/14
(Continued)

FOREIGN PATENT DOCUMENTS

JP    2003-323409    11/2003
JP    2006-243924     9/2006
(Continued)

OTHER PUBLICATIONS

Japanese Office Action dated Sep. 12, 2017 in corresponding Japanese Patent Application No. 2015-562673.
(Continued)

Primary Examiner — Dant B Shaifer Harriman
(74) Attorney, Agent, or Firm — Staas & Halsey LLP

(57) ABSTRACT

A service providing method, the method includes generating, by an information processing device, data relating to a session and a cookie relating to a certification including the data when the certification is successful in response to a certification request of the session received from a client device, transmitting, by the information processing device, the data and the cookie to the client device, receiving, by the information processing device, a service request which is given the data as a query parameter and the cookie from the client device, and providing, by the information processing device, a service of the service request to the client device when the data included in the cookie matches with the data which is given as the query parameter.

11 Claims, 17 Drawing Sheets

(58) Field of Classification Search
USPC .......................................................... 713/156
See application file for complete search history.

(56) References Cited

U.S. PATENT DOCUMENTS

| | | | | |
|---|---|---|---|---|
| 7,571,322 | B2* | 8/2009 | Karoubi | G06F 21/6263 |
| | | | | 713/172 |
| 7,890,634 | B2* | 2/2011 | Jiang | H04L 9/0825 |
| | | | | 709/227 |
| 8,239,926 | B1* | 8/2012 | Lin | H04W 4/21 |
| | | | | 726/7 |
| 8,402,141 | B2* | 3/2013 | Seraphin | H04L 63/08 |
| | | | | 709/227 |
| 8,479,020 | B2* | 7/2013 | Sprunk | H04L 9/0894 |
| | | | | 380/286 |
| 8,626,929 | B2* | 1/2014 | Jiang | H04L 9/0825 |
| | | | | 709/227 |
| 9,578,111 | B2* | 2/2017 | Kasivajjula | H04L 67/146 |
| 9,882,940 | B2* | 1/2018 | Hang | H04L 65/1066 |
| 2002/0073197 | A1* | 6/2002 | Bhogal | H04L 29/06 |
| | | | | 709/224 |
| 2002/0152378 | A1* | 10/2002 | Wallace, Jr. | H04L 63/0428 |
| | | | | 713/168 |
| 2003/0023754 | A1* | 1/2003 | Eichstadt | G06F 17/30873 |
| | | | | 709/246 |
| 2004/0078604 | A1* | 4/2004 | Rice | H04L 63/08 |
| | | | | 726/5 |
| 2007/0124482 | A1* | 5/2007 | Lee | H04L 63/0428 |
| | | | | 709/228 |
| 2007/0250702 | A1* | 10/2007 | Kirchhoff | H04L 63/029 |
| | | | | 713/151 |
| 2009/0028343 | A1* | 1/2009 | Sprunk | H04L 9/0894 |
| | | | | 380/286 |
| 2010/0146379 | A1 | 6/2010 | George et al. | |
| 2012/0089849 | A1* | 4/2012 | Tsai | G06F 21/6263 |
| | | | | 713/189 |
| 2013/0007869 | A1* | 1/2013 | Thomas | G06F 21/335 |
| | | | | 726/9 |
| 2014/0207566 | A1* | 7/2014 | Kamran | H04L 67/1095 |
| | | | | 705/14.45 |
| 2016/0359846 | A1* | 12/2016 | Yoshimuta | G06F 21/31 |

FOREIGN PATENT DOCUMENTS

| | | |
|---|---|---|
| JP | 2007-310512 | 11/2007 |
| JP | 2012-511776 | 5/2012 |
| WO | 2010/077443 A2 | 7/2010 |

OTHER PUBLICATIONS

Ishida, Katsumi: "5$^{th}$ Time of Java & Director for Game Making User Information," Java World, vol. 3, No. 2, Feb. 1999, pp. 123-128.

Yuki, "Kantan Jisso de Manabu Web Gijutsu 2006 Dai 8 Kai Cookie—Jotai Kanri to Tracking", Nikkei Software, 2007, vol. 10, No. 3, pp. 104-115.

Yanagihara et al., "Authentication and Access Control Technology Corresponding to Authority Management", Forum on Information Technology (FIT2002), Ippan Koen Ronbunshu, 2002, vol. 4, pp. 37-38.

International Search Report dated Mar. 18, 2014 in corresponding International Application No. PCT/JP2014/053618.

Written Opinion of the International Searching Authority dated Mar. 18, 2014 in corresponding International Application No. PCT/JP2014/053618.

"Getting HTML5 video to work with iOS Mobile Safari," posted May 17, 2013, retrieved Jul. 30, 2018 from fdiv.net/2013/05/17/getting-html5-video-work-ios-mobile-safari, pp. 1-2.

Japanese Report of Reconsideration by Examiner before Appeal dated Aug. 7, 2018, 6 pp.

\* cited by examiner

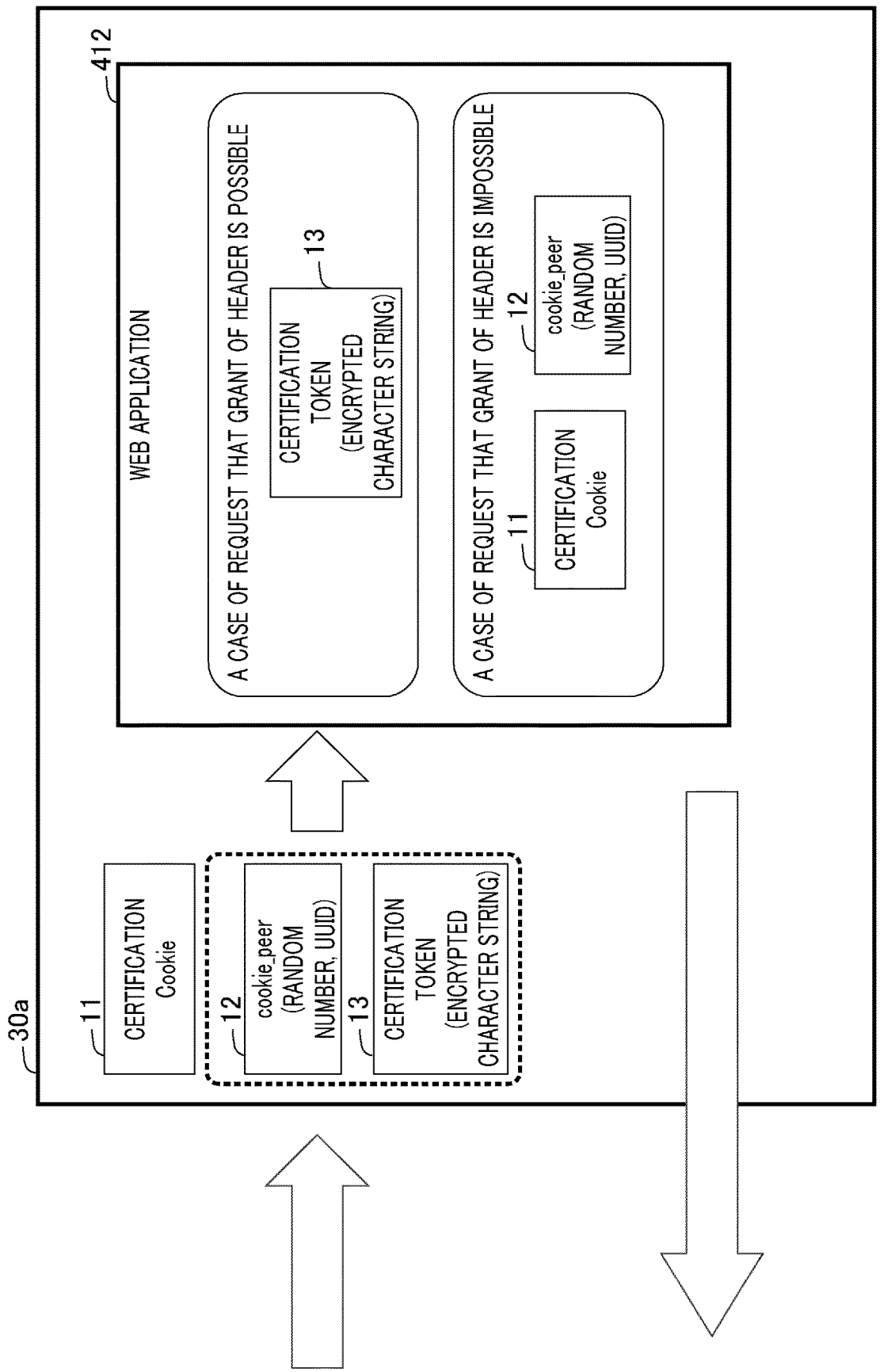

FIG. 15

```
<html>
<head>
<title>image.src-SETTING/ACQUIRING SOURCE OF IMAGE</title>
</head>
<body>
<img id="tmp">
<script type="text/javascript">
function load() {
    var cookie_peer = "Nonce";
    var img = document.getElementById("tmp");
    img.src = "https://fqdn/cell/box/image.jpg" + "?cookie_peer=" + cookie_peer;
    img.onload = function() {
        alert('COMPLETION OF IMPORT');
    }
}
</script>
<button onclick="load()">IMPORT</button>
</body>
</html>
```

| REQUEST LINE | POST /fqdn/cell/__auth HTTP/1.1 |
|---|---|
| MESSAGE HEADER | Content-Type: application/x-www-form-urlencoded<br>Accept:application/json |
| BLANK LINE | - |
| MESSAGE BODY | grant_type=password&username=user&password=password& `cookie=true` ─ cd11<br>└─────────── cd10 ───────────┘ |

R2

| REQUEST LINE | HTTP/1.1  200  OK |
|---|---|
| MESSAGE HEADER | Date: Mon, 25 Nov 2013 00:25:40 GMT<br>Content-Type: application/json<br>Transfer-Encoding: chunked<br>Connection: keep-alive<br>Set-Cookie: cookie=ABCDEFGHIJKabcdefghijk1234567890ABCDEFGHIJKabcdefghijk<br>1234567890ABCDEFGHIJKabcdefghijkABCDEFGHIJKabcdefghijk1234567890ABCDEFGHIJKabcdefghijk<br>abcdefghijkABCDEFGHIJKabcdefghijk1234567890ABCDEFGHIJKabcdefghijk<br>1234567890ABCDEFGHIJKabcdefghijk;Version=0;Comment=;Domain=fqdn;Path=/cell/;Secure ─ cd12 |
| BLANK LINE | - |
| MESSAGE BODY | [{"cookie_peer","fbxxxe591234512345hgfdsa123456789abcd", ─ cd13<br>"token_type":"Bearer",<br>"expires_in":3600,<br>"refresh_token":"XX9876543210abcdefghijKabcdefghijkABCDEFGHIJK0123456789abcdefghijkABCD<br>EFGHIJKabcdefghijkABCDEFGHIJK0123456789abcdefghijk",<br>"refresh_token_expires_in":86400,<br>"access_token":"XXABCDEFGHIJK1234567890abcdefghijkABCDEFGHIJK0123456789abcdefghijkABCD<br>1234567890ABCDEFGHIJKabcdefghijkABCDEFGHIJK1234567890ABCDEFGHIJKabcdefghijk"}] ─ cd14 |

| REQUEST LINE | GET /fqdn/cell/box/movie.mp4?cookie_peer=fbxxxe591234512345hgfdsa1234567890abcd HTTP/1.1 |
|---|---|
| MESSAGE HEADER | Accept:audio/mp4<br>If-None-Match: 1 -1390213749231<br>User-Agent: Mozilla/5.0 (Windows NT 6.1; WOW64; rv:26.0) Gecko/20100101 Firefox/26.0<br>Cookie:cookie==ABCDEFGHIJKabcdefghijk1234567890ABCDEFGHIJKabcdefghijk<br>1234567890ABCDEFGHIJKabcdefghijkABCDEFGHIJKabcdefghijk1234567890ABCDEFGHIJKabcdefghijk<br>abcdefghijkABCDEFGHIJKabcdefghijk1234567890ABCDEFGHIJKabcdefghijk<br>1234567890ABCDEFGHIJKabcdefghijk;Version=0;Comment=;Domain=fqdn;Path=/cell/;Secure |
| BLANK LINE | - |
| MESSAGE BODY | - | cd15, cd16

R4

| REQUEST LINE | HTTP/1.1 200 OK |
|---|---|
| MESSAGE HEADER | Date: Mon, 20 Jan 2014 10:33:52 GMT<br>Content-Type: audio/mp4<br>Connection: keep-alive<br>Etag: XXXXXXxxxx |
| BLANK LINE | - |
| MESSAGE BODY | MOVING IMAGE DATA — cd17 |

SERVICE PROVIDING METHOD, SERVICE REQUESTING METHOD, INFORMATION PROCESSING DEVICE, AND CLIENT DEVICE

CROSS-REFERENCE TO RELATED APPLICATION

This application is a continuation application of International Application Number PCT/JP2014/053618 filed on Feb. 17, 2014 and designated the U.S., the entire contents of which are incorporated herein by reference.

FIELD

The embodiments discussed herein are related to a service providing method, a service requesting method, an information processing device, and a client device.

BACKGROUND

SaaS (Software as a Service) is a service to provide a function of software such as an application to a user. By providing utilize service in a user data storage unit to the service on the SaaS, it is possible to gather data of various application that an individual and a corporation use. The user data storage unit has an access restriction function, and an access control based on certification Cookie and a certification token is performed, for example.

In a case that the certification Cookie is used, a server transmits the certification Cookie to a client when the user certification by the client is successful. The client adds the certification Cookie to a service request indicating the access to the user data storage unit and transmits it to the server. The server admits the access to the user data storage unit based on the certification Cookie.

CITATION LIST

Patent Document

[Patent document 1] Japanese Laid-Open Patent Publication No. 2007-310512

SUMMARY

However, when the server publishes the certification Cookie in a case the certification succeeds about a specific program, and judges the access right or wrong of the client by determining whether or not the certification Cookie same as the published certification Cookie is acquired from the client, a problem, that other programs, which uses same Web browser of the client, also utilizes the published certification Cookie and can access the user data storage unit in the server illegally, occurs.

According to an aspect of the embodiments, a service providing method, the method includes generating, by an information processing device, data relating to a session and a cookie relating to a certification including the data when the certification is successful in response to a certification request of the session received from a client device, transmitting, by the information processing device, the data and the cookie to the client device, receiving, by the information processing device, a service request which is given the data as a query parameter and the cookie from the client device, and providing, by the information processing device, a service of the service request to the client device when the data included in the cookie matches with the data which is given as the query parameter.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram explaining the certification when used the certification token 13 together with.

FIG. 14 is a diagram explaining the service request processing of the client 30a corresponding to FIG. 12 and FIG. 13.

FIG. 15 is a diagram representing an example of the script file "sc" describing the processing of the Web application 412.

FIG. 16 is a diagram representing an example of the HTTP request and the HTTP response of the certification demand.

FIG. 17 is a diagram illustrating an example of the HTTP request and the HTTP response of the access demand of the resource.

DESCRIPTION OF EMBODIMENTS

Embodiments will be described hereinafter according to the drawings. However, it is noted that the technical scope is not limited to the embodiments described below, but covers the matters described in the claims and the equivalents thereof.

[Service Providing System]

Figure 1:
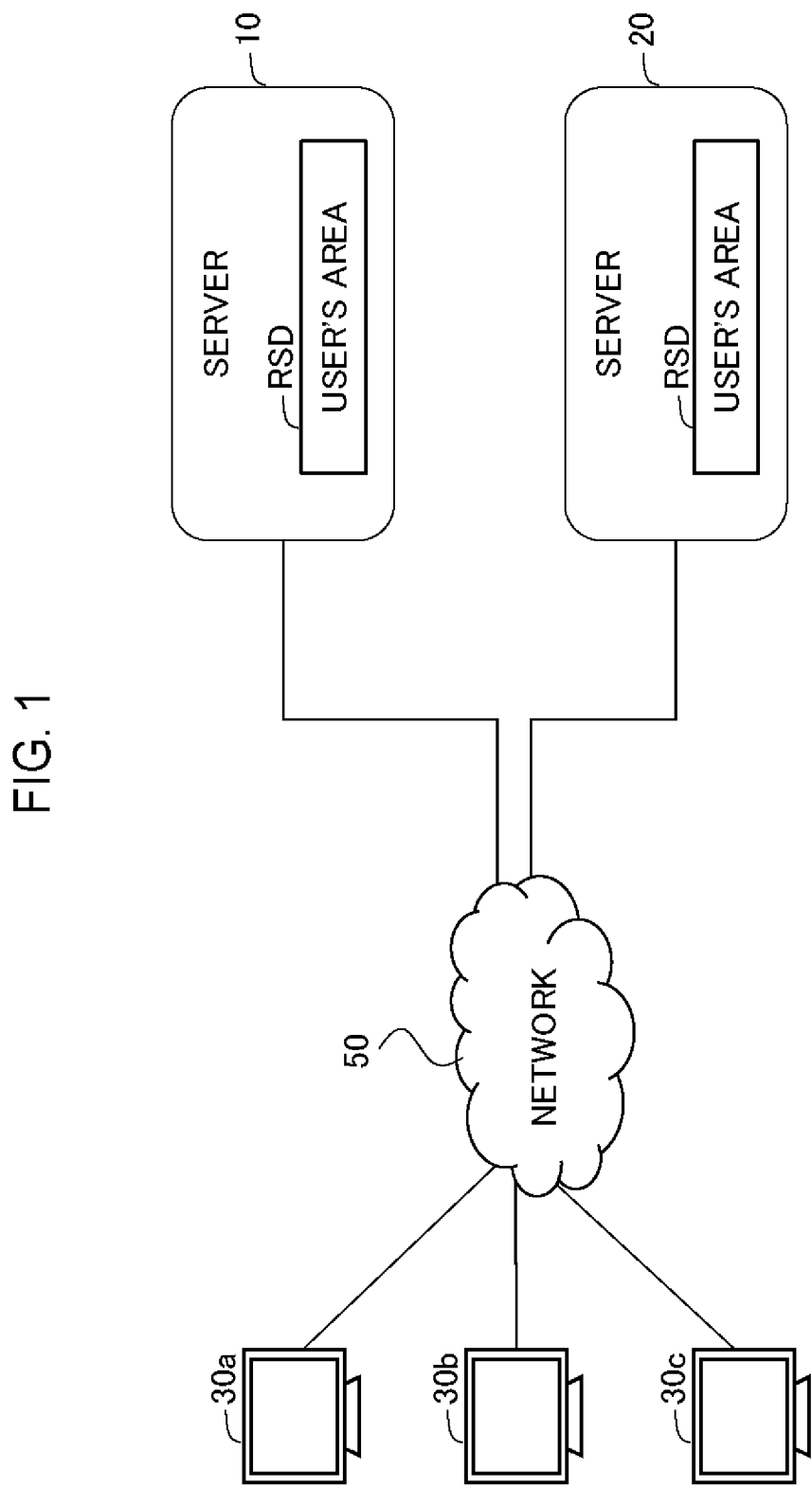
FIG. 1 is a diagram illustrating an example of constitution of the service providing system according to the embodiment.

FIG. 1 is a diagram illustrating an example of constitution of the service providing system according to the embodiment. In an example of FIG. 1, client devices (below, called as a client) 30*a*-30*c* connect with a plurality of information processing devices (below, called as a server) 10 and 20 through a network 50. The client 30*a*-30*c* is a personal computer or a handheld unit, for example.

For example, the servers 10, 20 in the example of FIG. 1 are Web servers. Each of servers 10, 20 has a user certification function based on account information registered beforehand. In addition, the servers 10, 20 have user's area RSD having access restriction. The user's area RSD stores the resources such as an image or an animation on a per-user basis, for example.

Each of servers 10, 20 transmits a certification result to the clients 30*a*-30*c* in response to a certification request from the clients 30*a*-30*c*. And the server 10, 20 provide a resource stored in the user's area RSD depending on the certification result in response to the access request of the resource transmitted by the clients 30*a*-30*b*.

[Constitution of Server]

Figure 2:
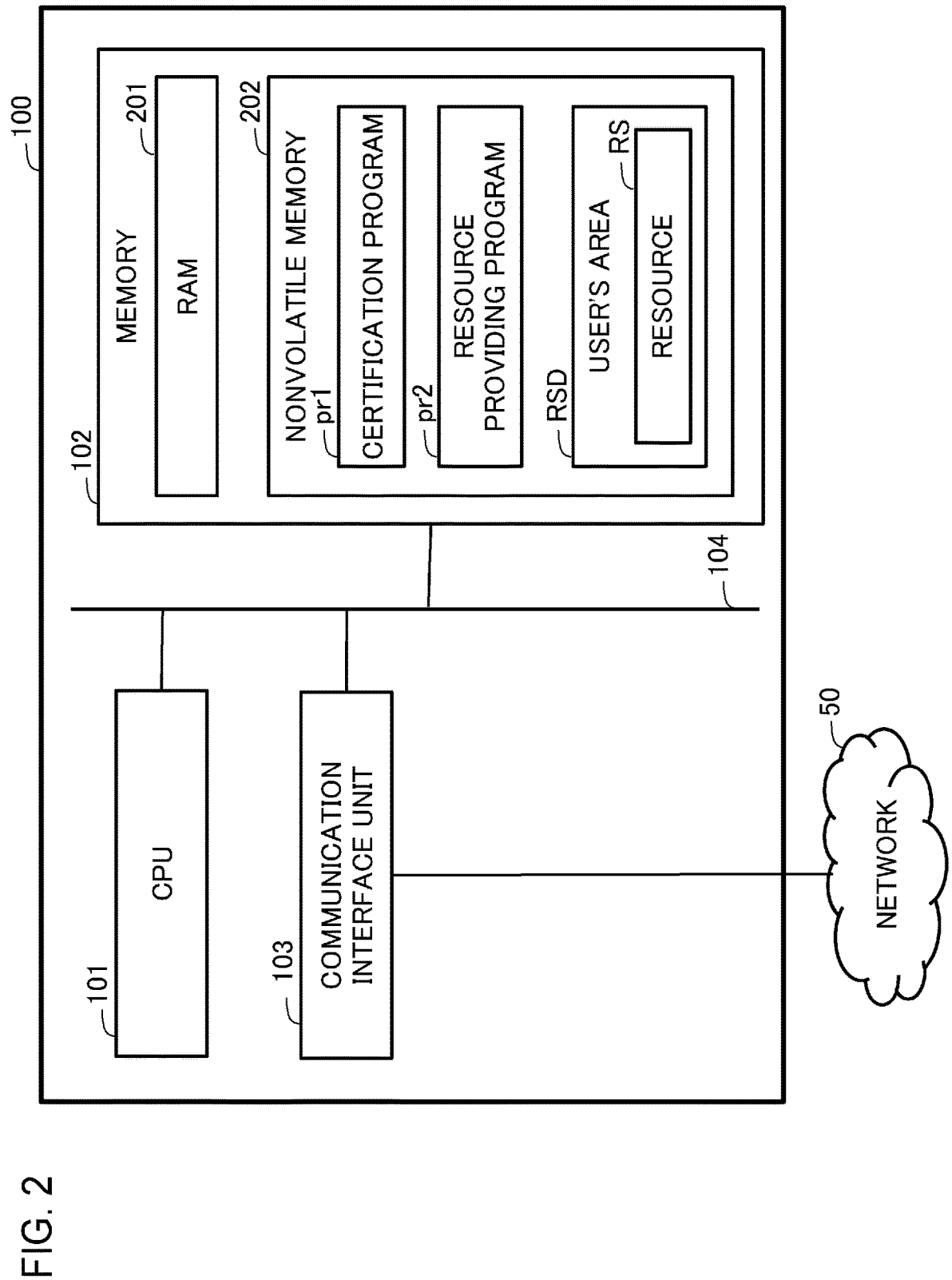
FIG. 2 is a diagram illustrating hardware constitution of the server 10 according to the embodiment depicted in FIG. 1.

FIG. 2 is a diagram illustrating hardware constitution of the server 10 according to the embodiment depicted in FIG. 1. FIG. 2 illustrates the constitution of the server 10, but the server 20 has similar constitution, too. The server 10 depicted in FIG. 2 has a CPU (Central Processing Unit) 101, a memory 102 including a RAM (Random Access Memory) 201 and a nonvolatile memory 202, etc., and a communication interface unit 103. The all parts are connected through a bus 104 mutually.

The CPU 101 is connected to the memory 102, etc. through the bus 104 and controls the whole server 10. The RAM 201 in the memory 102 memorizes the data which the CPU 101 processes. The nonvolatile memory 202 in the memory 102 has a domain (not illustrated in FIG. 2) storing the program of the OS (Operating System) that the CPU 101 carries out, a domain pr1 storing a certification program according to the embodiment, and a domain pr2 storing a resource providing program. In addition, the nonvolatile memory 202 has user's area RSD having the access restriction. The user's area RSD stores the resource RS such as the image or the animation of each user, for example. The nonvolatile memory 202 is constituted by an HDD (Hard disk drive) or a nonvolatile semiconductor storage device, etc.

The certification program (below called as certification program pr1) in the certification program domain pr1 and the resource providing program (below, called as resource providing program pr2) in the resource providing program domain pr2 realize the certification processing and the providing processing of the resource RS according to the embodiment by execution of the CPU 101. In addition, the communication interface unit 103 controls the transmission and reception of data between the communication device such as other server 20 or client 30*a*-30*c* through the network 50.

Figure 3:
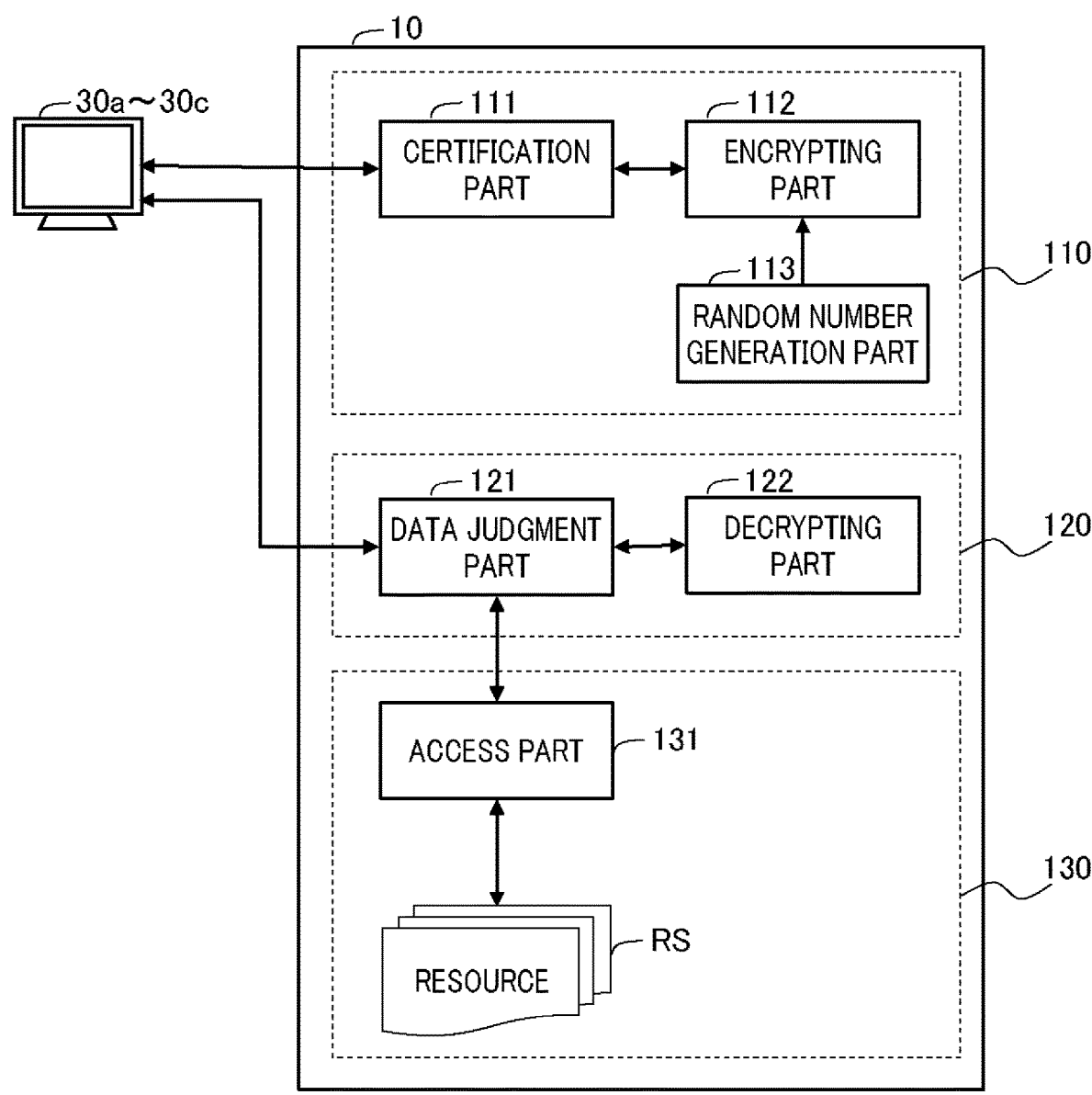
FIG. 3 is a software block diagram of server 10 depicted in FIG. 1 and FIG. 2.

FIG. 3 is a software block diagram of server 10 depicted in FIG. 1 and FIG. 2. FIG. 3 illustrates a block diagram of the server 10, but the block diagram of server 20 is similar to FIG. 3, too. The certification program pr1 (referring to FIG. 2) of the server 10 has a user certification module (below called as a user certification part) 110 and a request judgment module (below called as a request judgment part) 120, for example. The resource providing program pr2 (referring to FIG. 2) of the server 10 has a resource access module (below called as a resource access part) 130.

The user certification part 110 includes a certification module (below called as a certification part) 111, an encrypting module (below called as an encrypting part) 112, and a random number generation module (below called as random number generation part) 113. The certification part 111 performs the user certification based on the account information (a user ID and password) sent by the clients 30*a*-30*c* in response to a certification request (HTTP request) from the clients 30*a*-30*c*. For example, the certification part 111 performs the certification by judging whether the account information included in the certification request matches with the account information of the user registered beforehand.

When the certification succeeds, the certification part 111 publishes a certification token including role information indicating the role of the user in the server 10, and makes the random number generation part 113 to generate the data "cookie_peer". The data "cookie_peer" is data which have a number or a letter at random, called as nonce, for example. The encrypting part 112 encrypts the certification token and the data "cookie_peer" of which the certification part 111 generated. The certification part 111 generates the certification Cookie including the encrypted certification token and data "cookie_peer", and transmits the certification token and the data "cookie_peer" to the client 30*a*-30*c*.

In addition, the request judgment part 120 has data judgment module (below called as data judgment part) 121 and a decrypting module (below called as a decrypting part) 122. When the data judgment part 121 receives a resource access request (HTTP request) from the client 30*a*-30*c*, the data judgment part 121 makes the decrypting part 122 to decrypt the certification token and data "cookie_peer" included in the certification Cookie which is added to the resource access request. And the data judgment part 121 compares the data "cookie_peer" which is decrypted and the data "cookie_peer" which is added to the query parameter of the resource access request, and judge that the resource access request is a fair resource access request when both matches.

When it is determined that a resource access request is fair, the access module (below called as access part) 131 of the resource access part 130 accesses the resource RS based on the certification token. For example, the access part 131 accesses the resource RS targeted for the resource access request within the authority corresponding to the role information included in the certification token. And the data judgment part 121 transmits target resource RS which is acquired through the access part 131 to the client 30*a*-30*c*.

Then the hardware constitution and the software constitution of the client 30*a*-30*c* in the service providing system according to the embodiment will be exemplified.

[Constitution of the Client]

Figure 4:
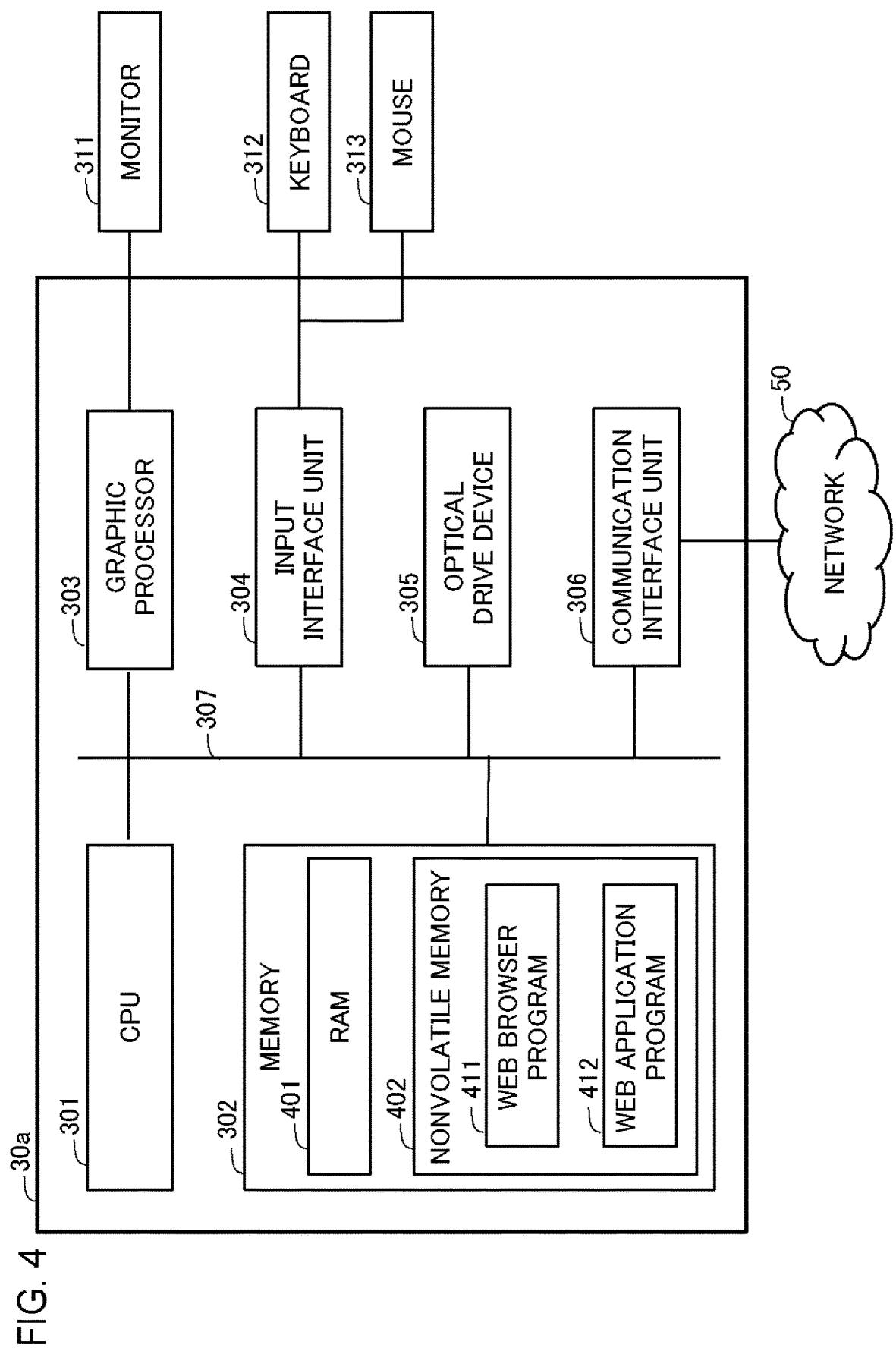
FIG. 4 is a diagram explaining hardware constitution of the client 30a depicted in FIG. 1.

FIG. 4 is a diagram explaining hardware constitution of the client 30*a* depicted in FIG. 1. FIG. 4 illustrates the constitution example of the client 30*a*, but, the clients 30*b*, 30*c* have similar constitution, too. The client 30*a* has a CPU (Central Processing Unit) 301, a memory 302 including a RAM (Random Access Memory) 401 and a nonvolatile memory 402, a graphic processor 303, an input interface unit 304, an optical drive device 305, and a communication interface unit 306. The all parts are connected through a bus 307 mutually.

The CPU 301 connects with the memory 302 and a plurality of peripheral devices through the bus 307 and controls the whole client 30*a*. The RAM 401 in the memory 302 is used for execution of the processing of the CPU 301 in the client 30*a*. In addition, the nonvolatile memory 402 in the memory 302 has a program storage domain (not illustrated in FIG. 4) of the OS (Operating System) that the CPU 301 carries out and a domain 411 storing a Web browser program. The Web browser program (below called as Web browser 411) in the Web browser program domain 411 realizes Web browser processing of the Web according to the embodiment by execution of the CPU 301.

In addition, the RAM 401 in the memory 302 has a domain 412 storing a Web application program. The Web application program (below called as Web application 412) in the Web application program domain 412 realizes processing of Web application according to the embodiment by execution of the CPU 301.

The graphic processor 303 is connected to a monitor 311. The graphic processor 303 displays an image to a screen of the monitor 311 according to an instruction from the CPU 301. For example, the monitor 311 is a liquid crystal display device. The input interface unit 304 connects with a keyboard 312 and a mouse 313. The input interface unit 304 transmits a signal which is received from the keyboard 312 and the mouse 313 to the CPU 301.

The Optical drive device 305 performs the reading of data recorded to an optical disk 314 using a laser beam. The optical disk 314 is a movable recording medium where the data were recorded to be readable by a reflection of the light. For example, the optical disk 314 is DVD (Digital Versatile Disc), DVD-RAM, CD-ROM (Compact Disc Read Only Memory), CD-R (Recordable)/RW (Re Writable). The communication interface unit 306 transmits and receives data between the servers 10, 20, etc. through the network 50.

Figure 5:
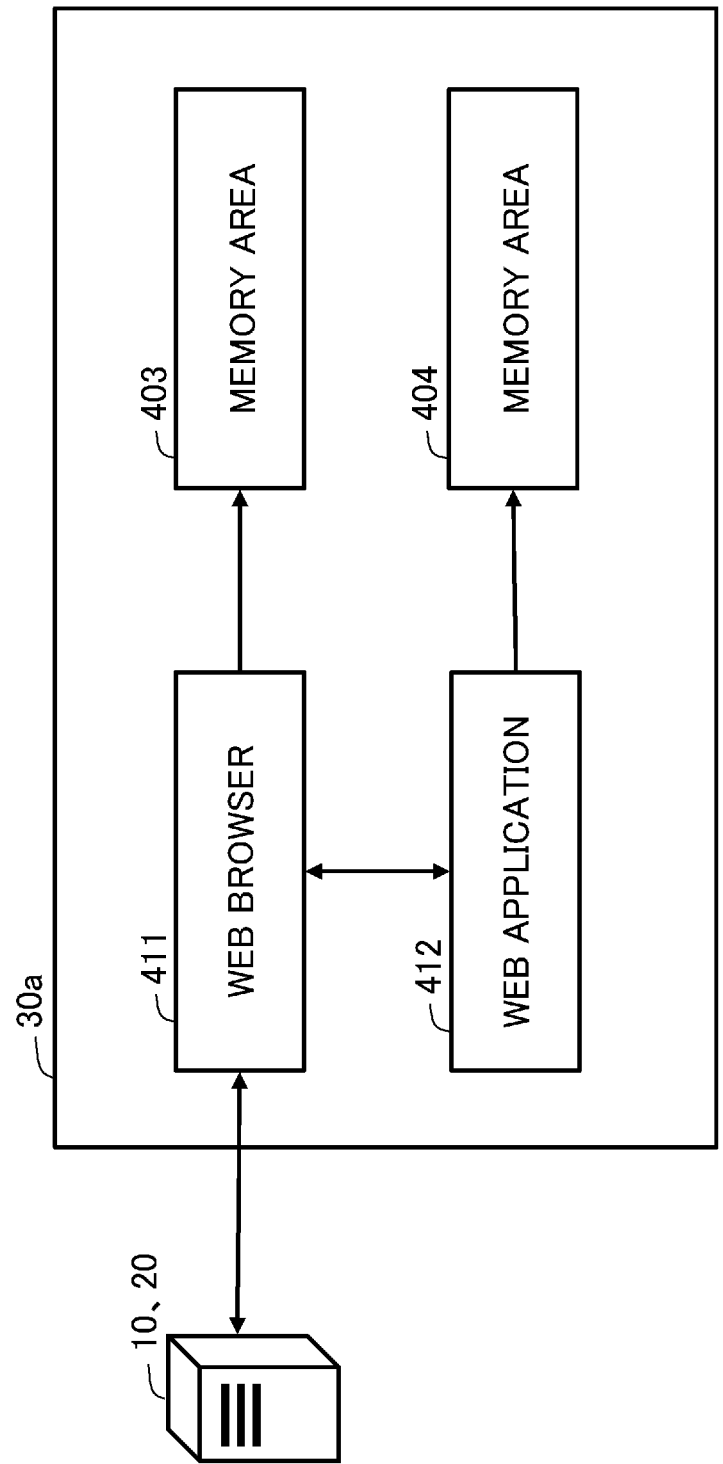
FIG. 5 is a diagram explaining software block of the client 30a according to the embodiment.

FIG. 5 is a diagram explaining software block of the client 30a according to the embodiment. The client 30a has a Web browser 411, a memory area 403 where the Web browser 411 access, Web application 412 and a memory area 404 where the Web application 412 access.

The Web browser 411 is a program to read a Web page. The Web browser 411 downloads an HTML (HyperText Markup Language) file or a picture file, etc. from the server 10 and analyzes a layout and displays and reproduces the Web page. The memory area 403 is a domain in the RAM 401 depicted in FIG. 4, and is a memory domain which stores the certification Cookie set for the Web browser 411.

In addition, the Web application 412 is a program to work through the network 50 (referring to FIG. 4) such as the Internet. The Web application 412 works by co-operating the programs such as Java Scripts (registered trade mark) to work on the Web browser 411 with the program of the Web server (server 10) side. The memory area 404 is a domain in the RAM 401 depicted in FIG. 4 and a memory area which is used by the Web application 412 and is released depending on the end of Web application 412.

When the HTTP response which is received from the server 10 is given the certification Cookie, the Web browser 411 stores the certification Cookie in the memory area 403. In addition, the Web application 412 stores the certification token and the data "cookie_peer" in the memory area 404 when the HTTP response is given the certification token and the data "cookie_peer".

Then, a basic operation of the certification by the certification Cookie will be described before explaining the service providing method according to the embodiment.

[Certification by Certification Cookie]

Figure 6:
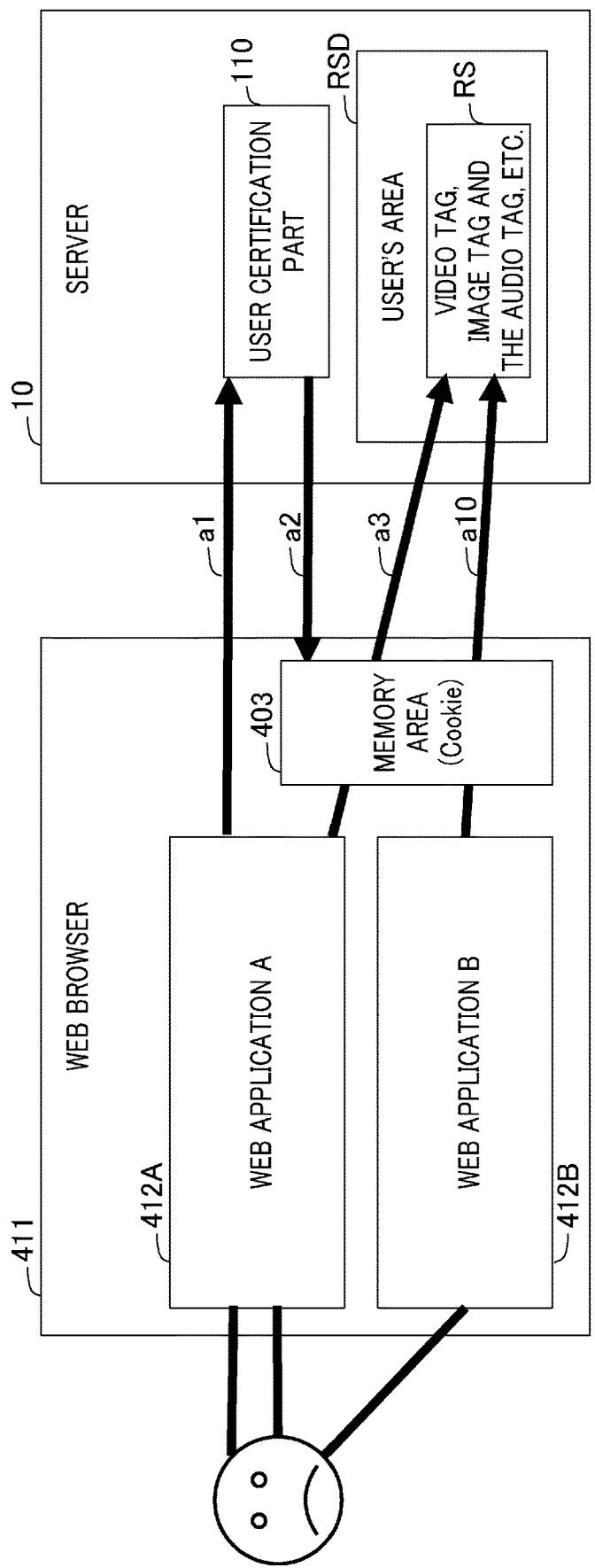
FIG. 6 is a diagram explaining the basic operation of the certification by the certification Cookie.

FIG. 6 is a diagram explaining the basic operation of the certification by the certification Cookie. The Web application A412A depicted in the example of FIG. 6 is a Web application 412 of the good will, and the Web application B412B is a Web application 412 of the malice. In addition, the user's area RSD in the server 10 is a domain where only a successful user of the user certification is accessible, and a domain storing the resource RS such as an animation or an image.

When a user inputs a URL (Uniform Resource Locator) of the service that the server 10 provides to an address column of the Web browser 411 to work on the client 30a, the Web browser 411 transmits the HTTP request which requests the Web page to the server 10. And the server 10 downloads the Web application A412A where the Web page is described as the HTTP response into the client 30a.

And the Web application A412A displays a user certification screen to enter the sign-in for the service that the server 10 provides through the Web browser 411. The Web application A412A sends the HTTP request including the account information which is input in response to the sign-in operation of the user to the server 10 (a1). The user certification part 110 in the server 10 performs the certification processing of the user based on the account information included in the HTTP request sent by the client 30a. The user certification part 110, when certifying that the user is a fair user, downloads the certification Cookie having result information of the certification and the information indicating a success of the certification as the HTTP response to the client 30a.

The Web browser 411 of the client 30a stores the certification Cookie which is received from the server 10 in the memory area 403 which is prescribed for the Web browser 411. In addition, the Web application A412A displays a certification result based on the contents of the HTTP response to the monitor 311 through the Web browser 411.

Then, when the Web application A412A accesses a resource stored in the user's area RSD of the server 10, the Web application A412A sends an HTTP request to require the providing of the resource to the server 10 (a3). In this time, the Web browser 411 adds the certification Cookie to the HTTP request automatically. When the server 10 receives the HTTP request, the server 10 detects that a user has been authenticated based on the certification Cookie and provides a target resource stored in the user's area RSD to the client 30a.

Then, the malicious Web application B412B will be described. FIG. 6 illustrates an example of the attack by cross site request forgeries (CSFR or XCFR) by the Web application B412B. When downloading the Web application A412A, the Web application B412B may be illegally downloaded under the same Web browser 411 management in the client 30a, for example. The Web application B412B may be included in a part of the Web page that the Web application A412A generates, for example.

The Web application B412B sends the HTTP request for accessing the URI where is the same as the Web application A412A which is detected beforehand (a10). Because the targeted pass that the Web application B412B accesses is the same as the Web application A412A, the Web browser 411 automatically adds the certification Cookie of the Web application A412A to the HTTP request that the Web application B412B sends. The certification Cookie indicates what have been authenticated. Therefore, the server 10 becomes able to provide the resource stored in the user's area RSD to the Web application B412B based on the certification Cookie though the HTTP request is published by the Web application B412B which has not been certificated. Thereby, it is possible that the Web application B412B causes reorganization and outflow of the resource based on the resource which is received from the server 10.

In this way, an access intrusion of the resource by the illegal use of the certification Cookie by the malicious Web application B412B becomes possible. Then, the certification operation when used the certification token together with will be described.

[Certification by Using Certification Token Together]

Figure 7:
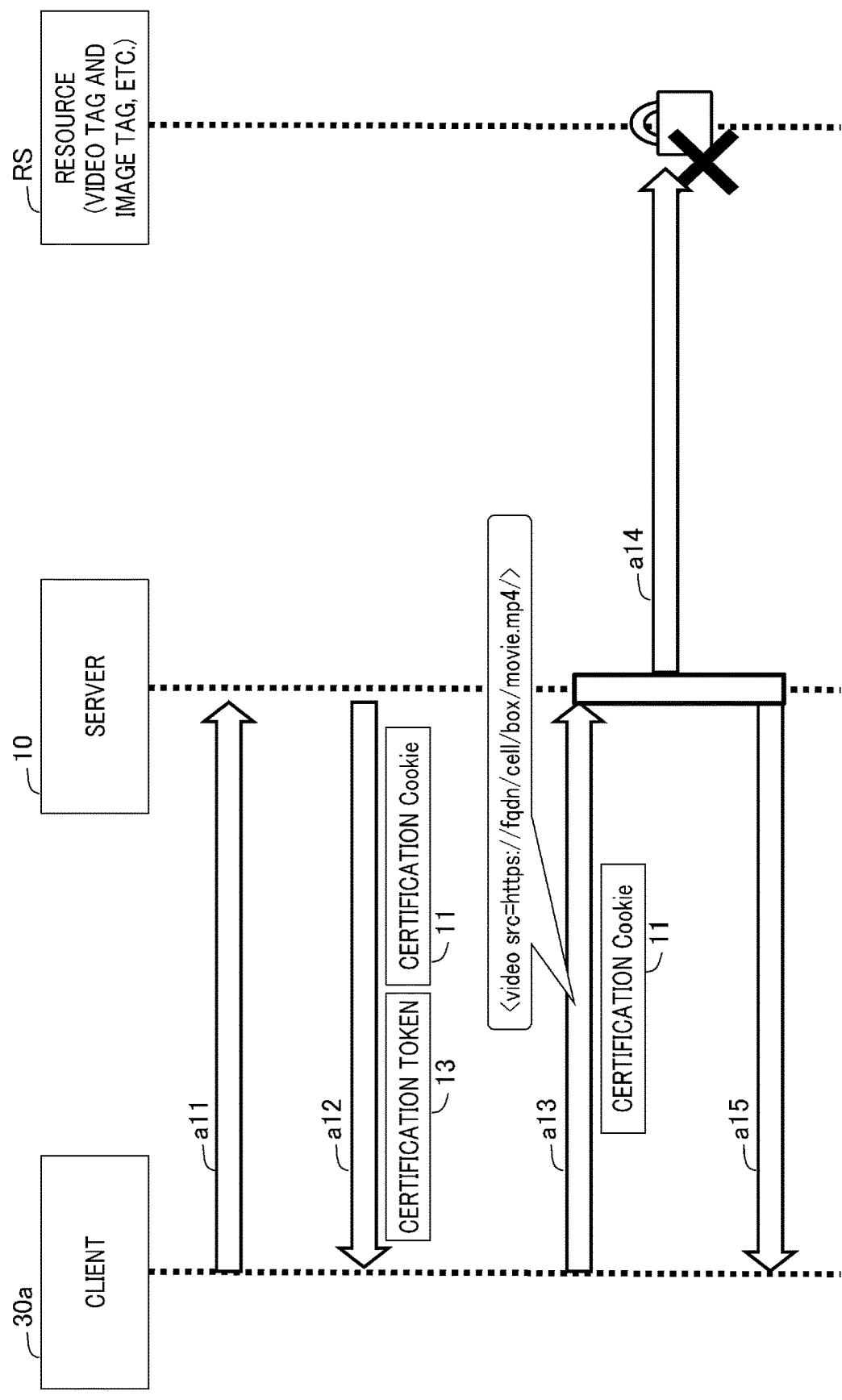

FIG. 7 is a diagram explaining the certification when used the certification token 13 together with. The certification token 13 is information published to the user who succeeded in the certification and has role information to define the providing range of the service provided by the server 10. It is possible that the client 30a receives the providing of the service provided by the server 10 within a range corresponding to the role information included in the certification token 13 by transmitting the access demand which is added the certification token 13 to the server 10.

As same as FIG. 6, the Web application 412 (referring to FIG. 4 and FIG. 5) transmits the HTTP request including the account information input in response to sign-in operation of the user to the server 10 (a11). And the server 10 transmits the certification token 13 to the client 30a as an HTTP response when the server authenticates that a user is a fair user based on the account information sent by the client 30a (a12). The Web application 412, when receiving the HTTP response, stores the certification token 13 in the memory area 404 where the Web application 412 accesses.

And the Web application 412, when accessing the resource RS in the user's area RSD of the server 10, grants the certification token 13 to the HTTP request which requires the resource RS and sends it to the server 10 (a13). The Web application 412, when calling API (Application Programming Interface) which accesses the resource RS for example, generates the HTTP request which appointed the certification token 13 in Authorization header, and sends it to the server 10. When the server 10 receives the HTTP request, the server 10 calls the API within the authority corresponding to the role information based on the role information that the certification token 13 has, and accesses the target resource RS stored in the user's area RSD. When the authority necessary for call of the API is short, the server 10 sends error information to the client 30a.

In addition, in the HTTP request (GET request) generated based on an HTML tag to order a demand of the resource RS, a grant of the certification token 13 is not carried out in the Authorization header of the HTTP request. Such an HTML tags include an HTML tag to order a demand of resource RS such as video tag and image tag, the audio tag, etc. for example. When the Authorization header of the HTTP request is not granted the certification token 13, it is not possible that the server 10 accesses the resource RS because the authority necessary for the access of the resource RS is short.

FIG. 7 illustrates an example of the HTTP request generated based on the video tag <video src=https://fqdn/cell/box/movie.mp4/></video>. This video tag is a tag which points out the implantation of video image "https://fqdn/cell/box/movie.mp4/" to the Web page. In addition, in an example of FIG. 7, the video image "https://fqdn/cell/box/movie.mp4/" indicates the resource RS which is stored in the user's area RSD of the server 10. Because the certification token 13 is not given in the Authorization header of the HTTP request generated based on the video tag in FIG. 7, it is not possible that the server 10 accesses the video image "https://fqdn/cell/box/movie.mp4/". When it is not possible to access the resource RS, the server 10 transmits the HTTP response indicating the access error to the client 30a (a15).

In addition, when granting the certification token to the HTTP request based on the HTML tag of the type which does not give the certification token 13 to the Authorization header such as the image tag or the video tag, it becomes to add the certification token as a query parameter of the HTTP request. However, not only a certification token, but the data given as a query parameter are in a condition to be able to acquire by the user and the malice application easily because the data given as a query parameter outputs in a column displaying the access URL in the browser for example. In other words, it is unfavorable in security to give the important information as the query parameter in the security because the data given in the query parameter are exposed easily.

As a different method to add the certification token to the HTTP request based on the HTML tag, it is considered to realize the processing corresponding to the HTML tag and using the certification token 13 by utilizing, for example, a programming language such as JavaScript etc. However, this method has little advantages for a case to use the HTML tag, because it takes a man-hour for the generation and management of the program and a large quantity of memory. Therefore, it is desirable to access to the resource RS according to the HTTP request generated based on the HTML tag.

In addition, by storing the resource RS for the access in the domain where the access is not restricted in the server 10, for example, it is possible to access to the resource according to an HTTP request generated based on an HTML tag. However, because it is avoided to store the information relating to personal information and privacy into the domain which is not restricted according to the viewpoint of security, the resource which stores it is limited.

As explained by FIG. 6, when accessing the resource RS based on the certification by the certification Cookie 11, a illegal use of the certification Cookie 11 by the malicious Web application B412B may be enabled. In addition, as explained by FIG. 7, when accessing the resource RS based on the certification with the certification token 13, the server 10 fails in access to the resource RS having the authorization, because the Authorization header of the HTTP request generated based on the HTML tag is not given the certification token 13.

Therefore, according to the service providing method of the embodiment, when the certification succeeds in response to the certification demand of the session that the server 10 received from the client 30a, the server 10 generates the data relating to the session and generates the certification Cookie 11 about the certification including the data and transmits the certification Cookie 11 and the data to the client 30a. And the server 10 receives service request given the data as the query parameter and the certification Cookie 11 from the client 30a and judges that received service request is a fair service request when the data included in the certification Cookie 11 matches with the data given as the query parameter and provides the service of the service request to the client 30a.

[Summary of Service Providing Method]

Then, the summary of the service providing method according to the embodiment will be described based on FIG. 8 and FIG. 9.

Figure 8:
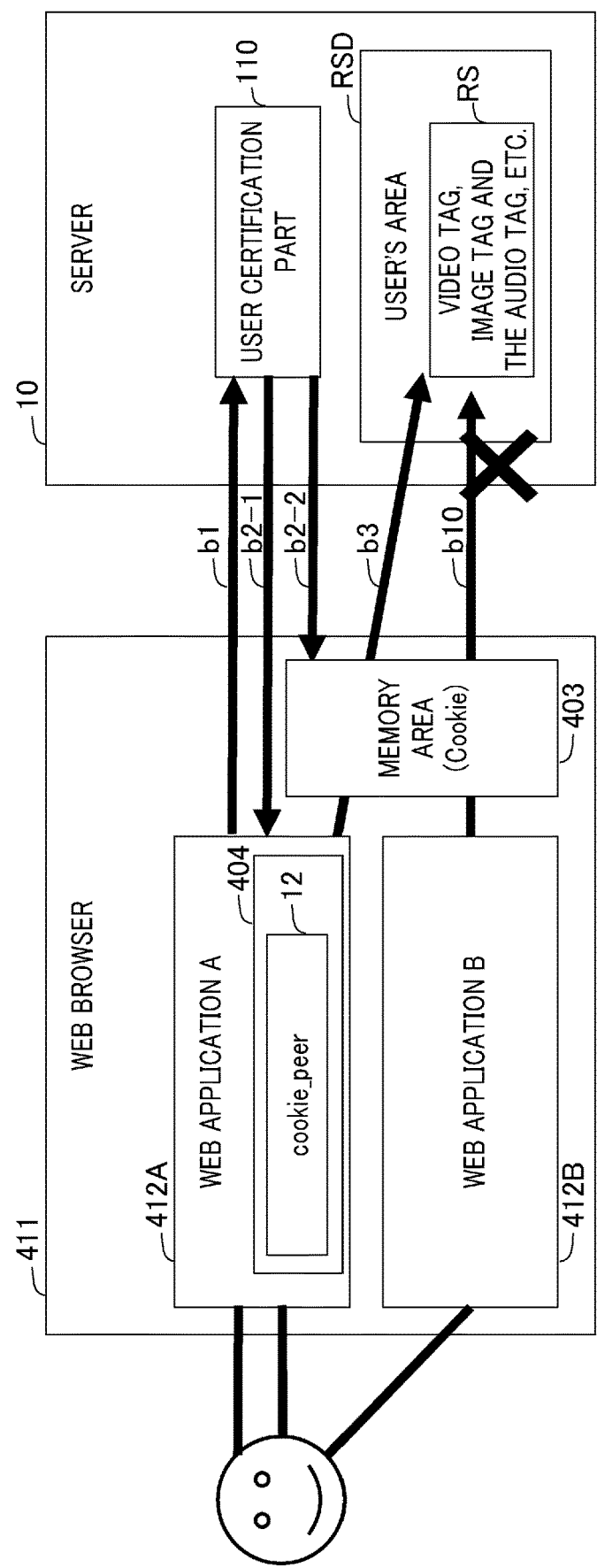
FIG. 8 is a diagram explaining the summary of the service providing method according to the embodiment.

FIG. 8 is a diagram explaining the summary of the service providing method according to the embodiment. FIG. 8 illustrates an example of the certification based on the certification Cookie 11, as same as FIG. 6. As same as FIG. 6, the Web application A412A transmits an account information which is inputted in response to the sign-in operation to the server 10 (b1). When the server 10 authenticates that a user is a fair user based on the account information sent by the client 30a, the server 10 transmits the data "cookie_peer" 12 (b2-1) in addition to the certification Cookie 11 (b2-2) which includes data "cookie_peer" 12 and has information about the certification to the client 30a.

The Web browser 411 in the client 30a stores the certification Cookie 11, which is received from the server 10, in the memory area 403 (b2-2). And the Web application A412A stores the data "cookie_peer" 12 in the memory area 404 where the Web application A412A accesses (b2-1). Because the memory area 404 is the domain where processes in the Web application A412A access, the different process (for example, the Web application B412B) is inhibited to access. In other words, the Web application B412B is inhibited to acquire the data "cookie_peer" 12 that the Web application A412A holds in the memory area 404.

And when the Web application A412A accesses a resource having access restrictions stored in the user's area RSD of each user in the server 10, the Web application A412A transmits the HTTP request that gave the data "cookie_peer" to the server 10 (b3). In this time, the Web browser 411 automatically gives the certification Cookie 11 to the HTTP request. And when the server 10 receives the HTTP request, the server compares the data "cookie_peer" 12 included in the certification Cookie 11 with the data "cookie_peer" 12 given in the HTTP request.

When the data "cookie_peer" 12 included in the certification Cookie 11 matches with the data "cookie_peer" 12 given to the HTTP request, the server 10 determines that the HTTP request is a fair resource access demand. In this case, the server 10 provides the target resource RS stored in the user's area RSD to the client 30a. In other words, the server determines that an HTTP request is a fair access demand when an HTTP request is given a set of the certification Cookie 11 including the data "cookie_peer" 12 and the data "cookie_peer" 12.

On the other hand, as same as FIG. 6, the Web application B412B transmits the HTTP request which accesses same URI as the Web application A412A (a10). In addition, the Web browser 411 gives the certification Cookie 11 of the Web application A412A to the HTTP request automatically. However, the Web application B412B does not give the data "cookie_peer" 12 to the query parameter of the HTTP request. Therefore, because the data "cookie_peer" 12 which is compared with the data "cookie_peer" 12 included in the certification Cookie 11 does not exist, the server 10 determines that the HTTP request is an unfair resource access demand.

In addition, even if an assailant knows the organization which gives the data "cookie_peer" to the HTTP request, it is difficult that the Web application B412B acquires the data "cookie_peer" 12 that the Web application A412A maintains in the memory area 404. In other words, the Web application which does not succeed for the certification is not able to give the data "cookie_peer" to the query parameter of the HTTP request. Therefore, it is not possible that the Web application B412B accesses the resource RS even if the Web application B412B misappropriates the certification Cookie 11 according to the service providing method of the embodiment.

In this way, the server 10 according to the embodiment judges that the HTTP request, which is given the certification Cookie 11 including the data "cookie_peer" 12 and the data "cookie_peer" 12 with a set, is a fair service request. In other words, even if the server 10 receives the HTTP request given the certification Cookie 11 including the data "cookie_peer", the server determines that the HTTP request is an unfair service request when the data "cookie_peer", which matches with the data "cookie_peer" in the certification Cookie 11, is not given to the HTTP request. Therefore, it is possible that the server 10 detects an unfair service request even if the certification Cookie 11 is misappropriated.

When the data "cookie_peer" does not match with even if the data "cookie_peer" is given as a query parameter, the server 10 determines that the HTTP request is an unfair service request. In other words, the data "cookie_peer" is used only for comparing with the data "cookie_peer" in the certification Cookie 11. Because the data "cookie_peer" is the data which has not a meaning in a simple substance, even if the query parameter is eavesdropped, the influence is extremely small.

In addition, the server 10 re-generates the data "cookie_peer" whenever the certification succeeds. Therefore, even if the data "cookie_peer" of the query parameter is eavesdropped and is given to the query parameter, the server determines that the HTTP request is an unfair HTTP request when the data "cookie_peer" does not match with the data "cookie_peer" included in the certification Cookie 11. Therefore, it is possible that the server 10 controls outbreak of the unfair access even if the data "cookie_peer" of the query parameter is eavesdropped.

In addition, according to the service providing method according to the embodiment, it is possible to determine whether an access demand is fair or unfair only based on information (the data "cookie_peer" 12 and the certification Cookie 11) that the client 30a sends. Therefore, the server 10 does not have to manage the information for the certification every session that succeeded for the certification.

Figure 9:
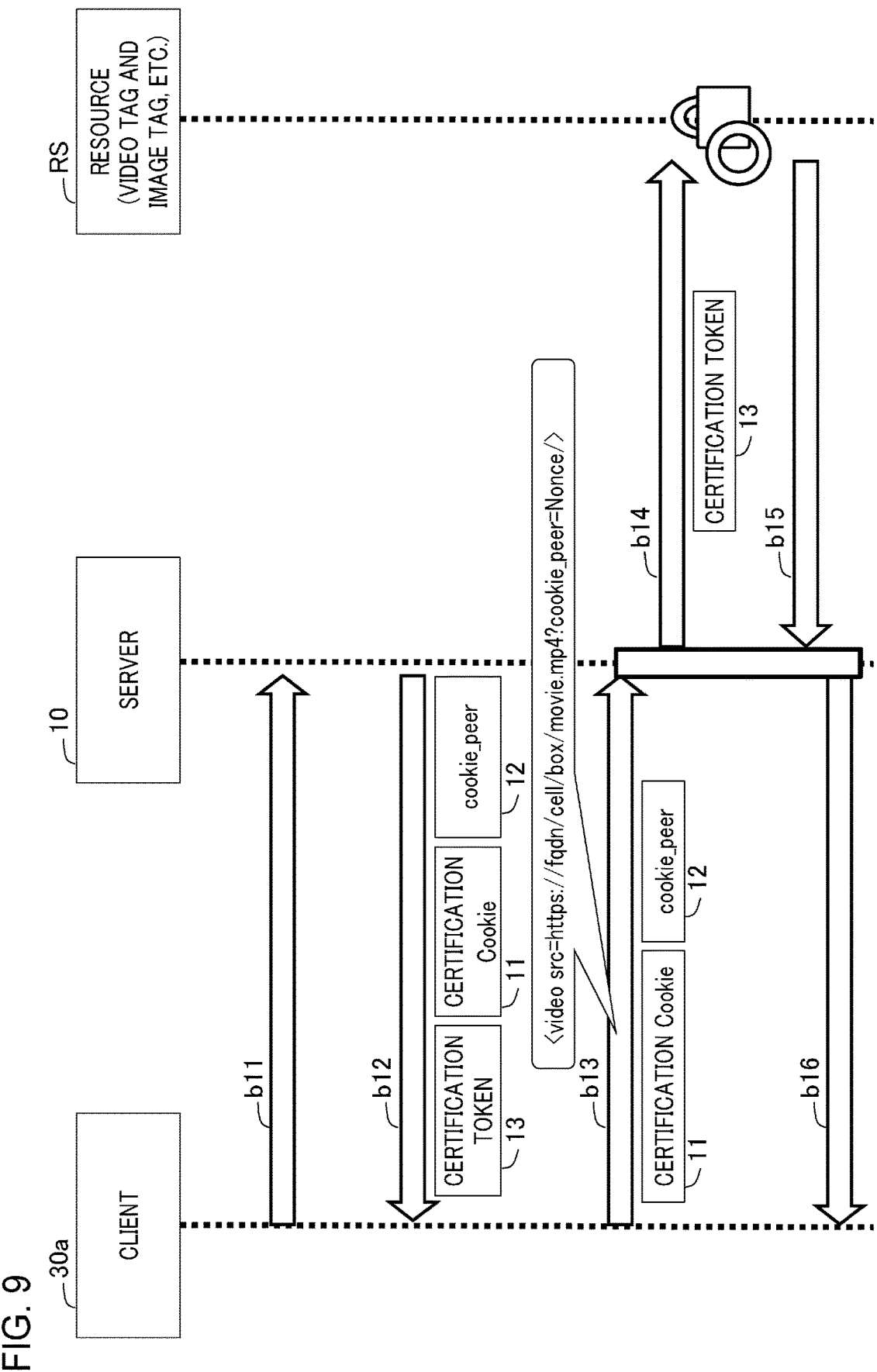
FIG. 9 is a diagram explaining the summary of the service providing method of using the certification token 13.

FIG. 9 is a diagram explaining the summary of the service providing method of using the certification token 13. FIG. 9 illustrates an example of the certification based on the certification token 13, as same as FIG. 7. As same as FIG. 7, the Web application 412 (referring to FIG. 4 and FIG. 5) sends an account information which is inputted in response to sign-in operation to the server 10 (b11). The server 10 transmits the data "cookie_peer" 12 and the certification Cookie 11 including the certification token 13 and the data "cookie_peer" 12 to the client 30a when the server 10 authenticates that a user is a fair user based on the account information sent by the client 30a (b12).

The Web browser 411 of the client 30a stores the certification Cookie 11 which is received from the server 10 in the memory area 403. In addition, the Web application 412 holds the data "cookie_peer" 12 and the certification token 13 in the memory area 404 where the Web application 412 accesses.

And the Web application 412 gives the data "cookie_peer" to the HTTP request as a query parameter when the Web application 412 accesses the resource RS stored in the user's area RSD based on the HTML tag (b13). Especially, the query parameter is added to the end of URI of the HTML tag by the format of "?"variable name"="value"". In the example of FIG. 9, "video src=https://fqdn/cell/box/movie.mp4?cookie_peer=Nonce/" is exemplified as the video tag. The "Nonce" indicates a value of data "cookie_peer". In addition, the Web browser 411 gives the certification Cookie 11 to the HTTP request automatically.

And server 10 determines that the HTTP request is a fair resource access demand when the data "cookie_peer" 12 included in the certification Cookie 11 matches with the data "cookie_peer" 12 given to the HTTP request after receiving the HTTP request. When the server 10 determines that the HTTP request is a fair resource access demand, the server 10 judges whether there is authority to the resource RS which the access demand targets, based on the role information that the certification token 13 included in the certification Cookie 11 has. When there is authority, the server 10 acquires the resource RS and transmits it to the client 30a as an HTTP response.

As represented by FIG. 9, the server 10 according to the embodiment generates the certification Cookie 11 including the certification token 13 more in addition to the data "cookie_peer" 12. And the server 10 provides the service of the service request to the client 30a, based on authority information of the certification token 13 included in the certification Cookie 11, when the certification Cookie 11 including the data "cookie_peer" 12 and the certification token 13 and the data "cookie_peer"12 in a pair are given to the service request.

Accordingly, it is possible that the server 10 provides the service based on the certification token 13 by using the certification token 13 included in the certification Cookie 11 in addition to the effect which is explained in FIG. 8, even if an HTTP request is not given the certification token in the Authorization header. In addition, the server 10 uses the certification token 13 included in certification Cookie 11 only when the data "cookie_peer" 12 included in the certification Cookie 11 matches with the data "cookie_peer" 12 appointed in the query parameter. In other words, because the server 10 does not use certification token 13 when the data "cookie_peer" 12 included in the certification Cookie 11 does not match with the data "cookie_peer" 12 appointed in the query parameter, it is possible to evade that the certification token 13 is used illegally even if the certification Cookie 11 is plagiarized.

[Processing of Service Providing]

Figure 10:
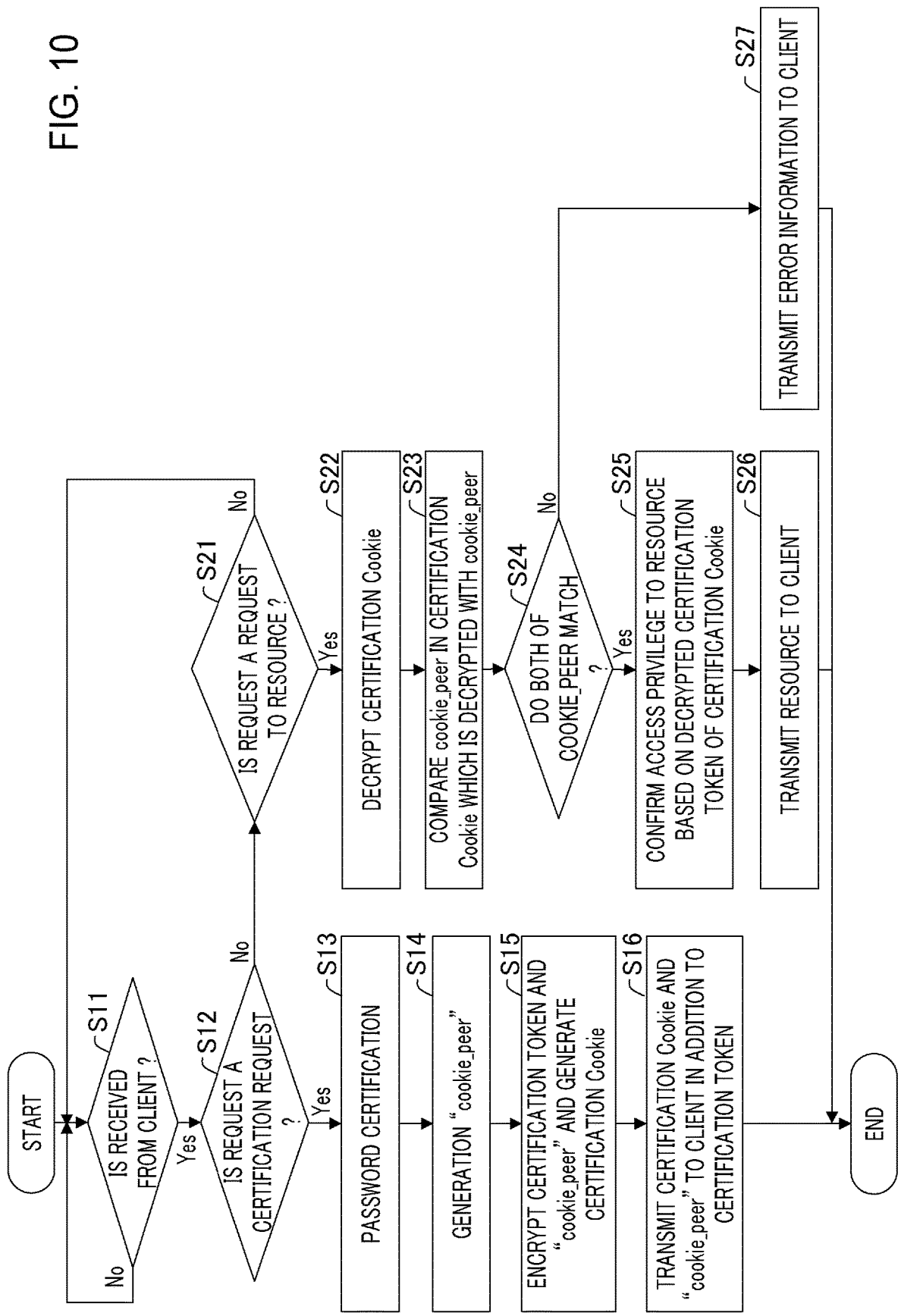
FIG. 10 is a diagram of flow chart explaining the processing of the server according to the embodiment in FIG. 9.

FIG. 10 is a diagram of flow chart explaining the processing of the server according to the embodiment in FIG. 9. The server 10 determines whether the server 10 received the HTTP request from the client 30a (S11). When the server 10 received the HTTP request from the client 30a (YES of S12), the certification part 111 in the server 10 compares the account information included in the HTTP request with the account information registered beforehand, and authenticates that a user is a fair user when there is the account information which matches each other. When authenticating that the user is a fair user, the certification part 111 in the server 10 produces the certification token 13, and the random number generation part 113 generates a random number as the data "cookie_peer" 12 (S14).

As described above, the certification token 13 is a token published to the user who succeeded in the certification and has role information to define the providing range of the service that the server 10 provides. In addition, the data "cookie_peer" 12 is a random value consisting of a number and letter and is generated in response to the session that succeeded for the certification.

Then, the encrypting part 112 in the server 10 encrypts the certification token 13 and the data "cookie_peer" 12 and generates the certification Cookie 11 including the encrypted certification token 13 and the encrypted data "cookie_peer" 12 (S15). The encrypting part 112 may encrypt the certification token 13 and the data "cookie_peer" 12 individually, and include the value which is connected both encryption value in the certification Cookie 11 and may encrypt the value which is connected the certification token 13 and the data "cookie_peer" 12. In addition, the server 10 does not need to encrypt the certification token 13 and the data "cookie_peer".

In addition, the certification Cookie 11 includes an instruction that the certification Cookie 11 is effective only for the URI corresponding to the service of the server 10 which is authenticated, and an instructions to remove the certification Cookie 11 at the time of end of the Web browser 411 of the client 30a. And the server 10 transmits the certification Cookie 11, the data "cookie_peer" 12 and the certification token 13 to the client 30a (S16).

On the other hand, when the server 10 receives the HTTP request of the service request of the resource from the client 30a (NO of S12, YES of S21), the decrypting part 122 in the server 10 decrypts the certification token 13 and the data "cookie_peer" 12 included in the certification Cookie 11 given to the HTTP request (S22). When the certification token 13 and the data "cookie_peer" 12 are not encrypted, the decrypting processing is unnecessary.

The HTTP request is given the data "cookie_peer" 12 as a query parameter in addition to the certification Cookie 11. The data judgment part 121 in the server 10 compares the decrypted data "cookie_peer" 12 included in the certification Cookie 11 with the data "cookie_peer" 12 given as a query parameter (S23). When both data "cookie_peer" match (YES of S24), the access part 131 in the server 10 confirms the access privilege to the resource RS which the HTTP request targets based on the decrypted certification token 13 included in the certification Cookie 11 (S25). When there are the access privilege to the target resource RS, the server 10 transmits the target resource to the client 30a as the HTTP response (S26).

In addition, when the Authorization header in the HTTP request which is received is given the certification token 13, namely, when the HTTP request which is received is the HTTP request based on the API, etc., the server 10 performs the access of the resource based on the certification token 13 without using the certification Cookie 11. In this case, the server 10 omits processing of the process S22-S24, and carries out the processing of the process S25 and S26 based on the certification token 13.

On the other hand, when the decrypted data "cookie_peer" 12 included in the certification Cookie 11 does not match with the data "cookie_peer" 12 given to the HTTP request (NO of S24), the server 10 sends the certification error of the HTTP request to the client 30a as then HTTP response (S27). For example, the server 10 notifies that an HTTP request is an unfair request to the client 30a.

Figure 11:
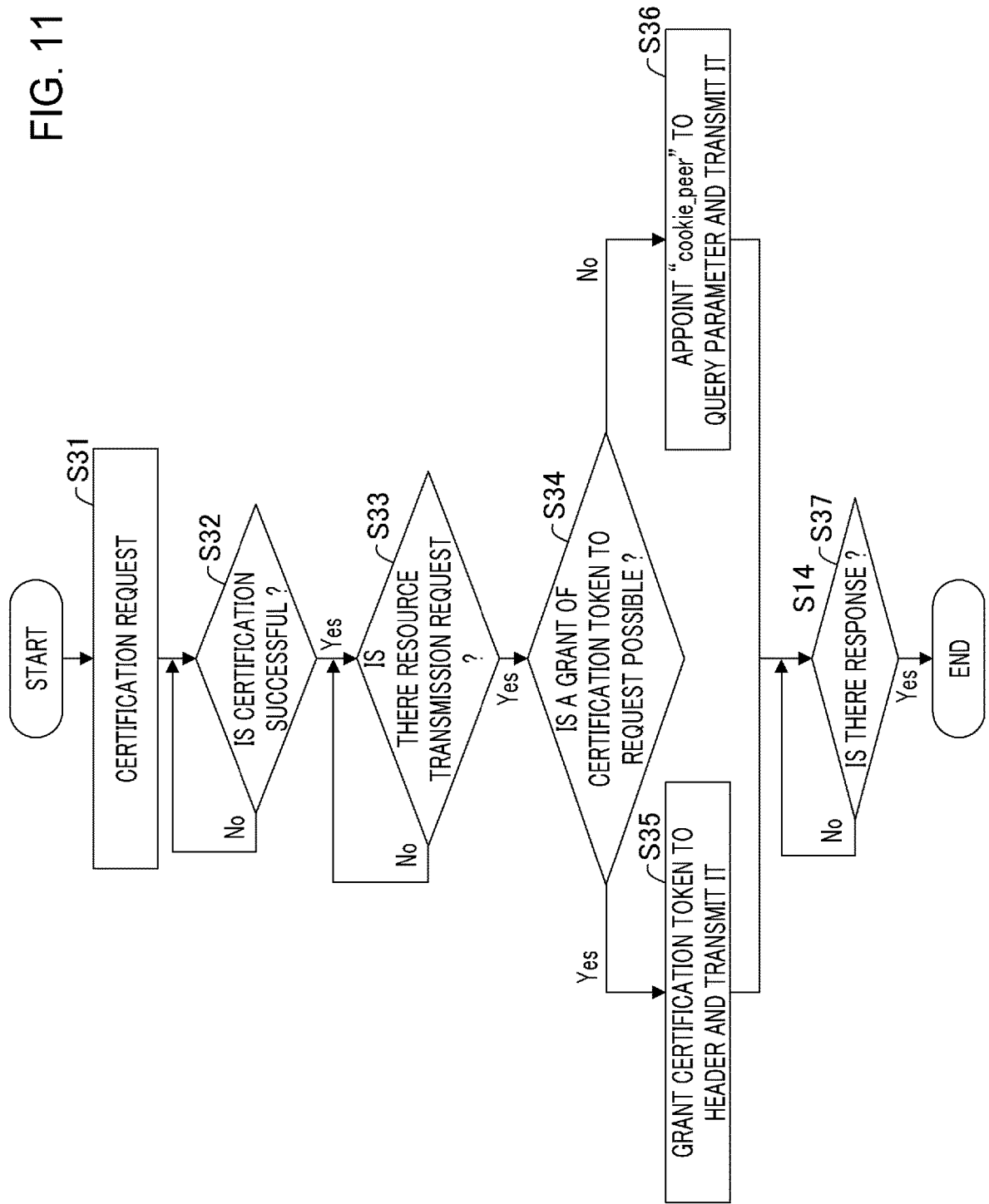
FIG. 11 is a diagram of flow chart explaining the processing of the client in conjunction with FIG. 10.

FIG. 11 is a diagram of flow chart explaining the processing of the client in conjunction with FIG. 10. When the sign-in operation is carried out, the Web application 412 which works through the Web browser 411 on the client 30a sends the HTTP request indicating the certification demand to the server 10 (S31).

And the Web application 412 waits by the reply from the server 10 to the HTTP request of the certification demand. When the Web application 412 receives a reply indicating the certification success (YES of S32), the Web browser 411 holds the certification Cookie 11 in the memory area 403, and the Web application 412 holds the certification token 13 and the data "cookie_peer" given as the query parameter in the memory area 404. Then, the Web application 412 judges whether there is the HTTP request indicating the service request of the resource that the server 10 has (S33).

The Web application 412 determines there is the service request of the resource (YES of S33), the Web application 412 judges whether or not the service request of the resource is a service request that the grant of certification token 13 to the Authorization header of the HTTP request is possible (S34). When the service request is the HTTP request that the grant of certification token 13 to the Authorization header is possible (YES of S34), the Web application 412 sends the HTTP request given the certification token 13 to the Authorization header to the server 10 (S35). The Web browser 411 gives the certification Cookie 11 to the HTTP request automatically then. The HTTP request that a grant of certification token 13 in the Authorization header is possible is an HTTP request to call the API of the server 10, for example.

On the other hand, when the service request is the HTTP request that the grant of certification token 13 to the Authorization header is not possible (NO of S34), the Web application 412 generates the HTTP request that gave the data "cookie_peer" 12 as the query parameter and sends it to the server 10 (S36). The Web browser 411 gives the certification Cookie 11 to the HTTP request automatically then. The service request that the grant of a certification token to the Authorization header of the HTTP request is not possible is an HTTP request based on the HTML tag, for example.

And when the Web application 412 sends the HTTP request that is given the certification token 13 or the HTTP request that is given the data "cookie_peer" 12 as a query parameter to the server, the Web application 412 waits by an HTTP response from the server 10 corresponding to the HTTP request (S37). When the Web application 412 receives the HTTP response from the server 10, the Web application 412 carries the processing based on the HTTP response which is received.

Then the processing of the server 10 and the client 30a which are explained in flow chart of FIG. 10 and FIG. 11 will be described based on FIG. 12-FIG. 15 concretely.

Figure 12:
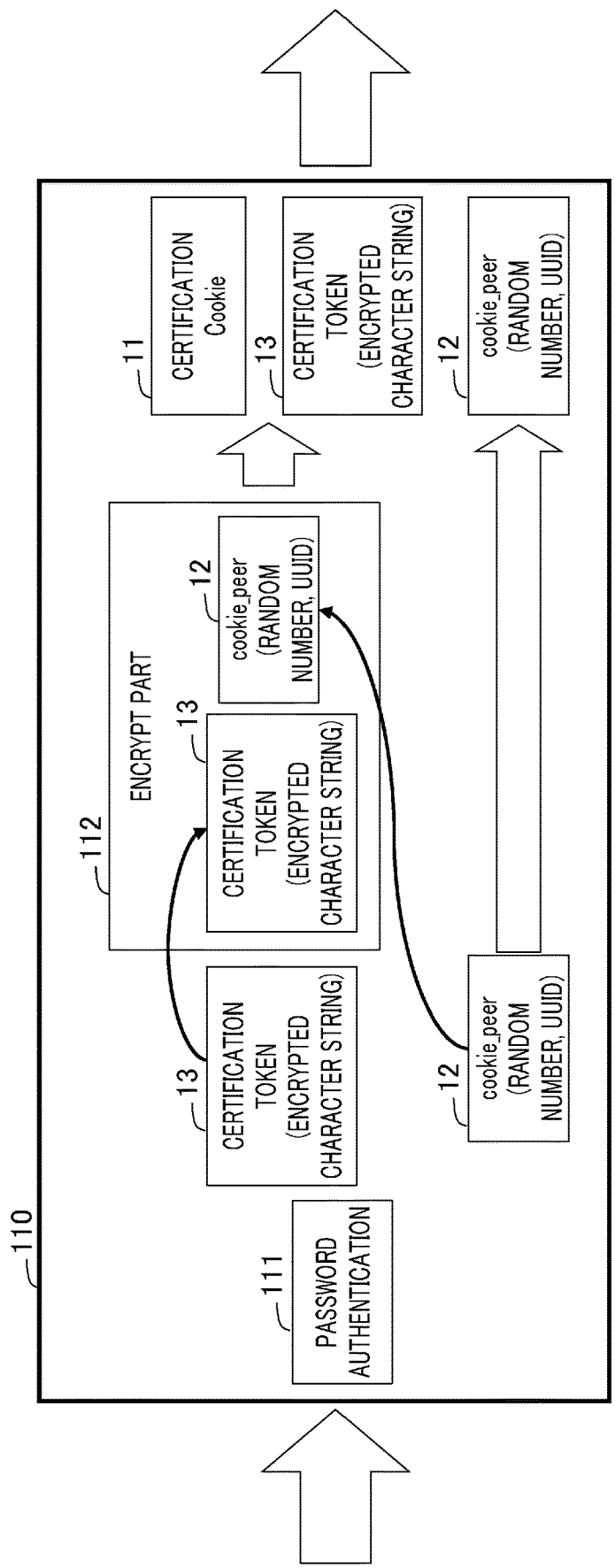
FIG. 12 is a diagram explaining the processing when the server 10 receives the certification request according to the embodiment which uses the certification token together.

FIG. 12 is a diagram explaining the processing when the server 10 receives the certification request according to the embodiment which uses the certification token together. The processing which is explained in FIG. 12 corresponds with the processing of user certification part 110 of the block diagram of the server 10 depicted in FIG. 3.

As described above, when the certification part 111 in the user certification part 110 of the server 10 receives the certification request from the client 30a (S12 in FIG. 10), the certification part 111 authenticates a password based on the user ID and the password included in the request (S13). When the authentication succeeds, the certification part 111 produces the certification token 13, and the random number generation part 113 in the server 10 generates the data "cookie_peer" 12 (S14). For example, the certification token 13 has encrypted character string.

Then, the encrypting part 112 in the server 10 connects the data "cookie_peer" 12 with the certification token 13, and encrypts it. And the encrypting part 112 generates the certification Cookie 11 including the certification token 13 and the data "cookie_peer" 12 which are encrypted (S15). And The server 10 transmits the certification token 13 and the data "cookie_peer" 12 in addition to the certification Cookie 11 which is generated to the client 30a as an HTTP response (S16).

Figure 13:
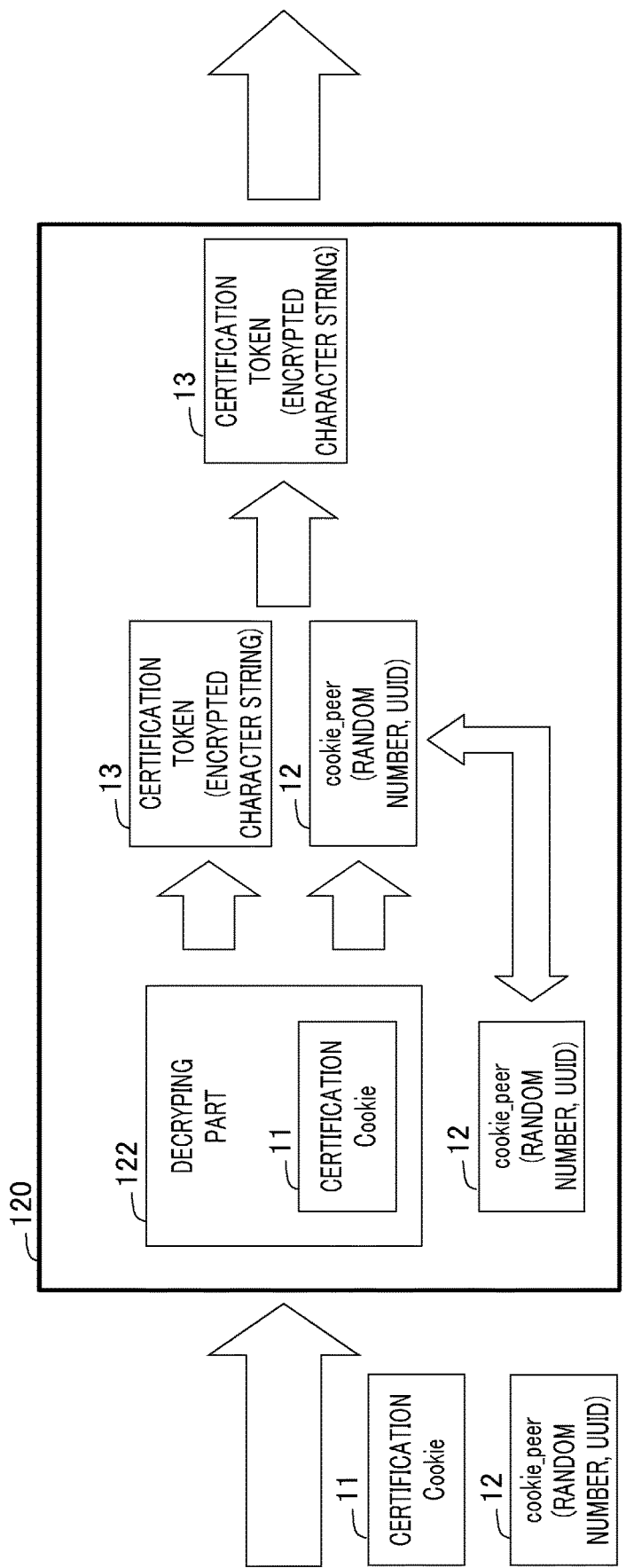
FIG. 13 is a diagram explaining the processing when the server 10 acquires the service request according to the embodiment which uses a certification token together.

FIG. 13 is a diagram explaining the processing when the server 10 acquires the service request according to the embodiment which uses a certification token together. When the server 10 receives the HTTP request indicating the service request of the resource RS which is stored in the user's area RDS having access restriction (S21 of FIG. 10), the server 10 carries out the processing depicted in FIG. 13. The processing which is explained in FIG. 13 corresponds with the processing of request judgment part 120 in the block diagram of the server 10 depicted in FIG. 3.

As mentioned above, the HTTP request is given the certification Cookie 11 and is given the data "cookie_peer" 12 as the query parameter. The decrypting part 122 in the request judgment part 120 in the server 10 decrypts the information included in the certification Cookie 11 which is received and acquires the certification token 13 and the data "cookie_peer" 12 (S22). And the data judgment part 121 in the request judgment part 120 compares the data "cookie_peer" 12 included in the certification Cookie 11 with the data "cookie_peer" 12 given as the query parameter (S23), and judges that the HTTP request is a fair access demand when both of the data "cookie_peer" correspond with each other (YES of S24).

When the HTTP request is a fair access demand, the resource access part 130 in the server 10 confirms whether or not the HTTP request has the access privileges of the target resource corresponding to the access demand based on the certification token 13 (S25). When the HTTP request has the access privileges, the server 10 transmits the target resource to the client 30a as an HTTP response (S26).

FIG. 14 is a diagram explaining the service request processing of the client 30a corresponding to FIG. 12 and FIG. 13. As mentioned above, when the certification succeeds (YES of S32 in FIG. 11), the Web application 412 in the client 30a receives the certification Cookie 11 and the data "cookie_peer" 12 and the certification token 13 from the server 10. As described above, the Web browser 411 stores the certification Cookie 11 into the memory area 403 where the Web browser 411 accesses. In addition, the Web application 412 stores the data "cookie_peer" 12 and the certification token 13 in the memory area 404 where the Web application 412 accesses.

When the Web application 412 transmits an access demand to the server 10 (YES of S33), the Web application 412, in case that the grant of the certification token 13 to the Authorization header in the HTTP request is possible (YES of S34), generates the HTTP request given the certification token 13 to the Authorization header and sends it to the server 10. In addition, the Web browser 411 gives the certification Cookie 11 to the HTTP request automatically.

On the other hand, when the grant of the certification token 13 to the Authorization header in the HTTP request is impossible (NO of S34), the Web application 412 adds the data "cookie_peer" 12 to the HTTP request as a query parameter (S36). In addition, the Web browser 411 gives the certification Cookie 11 to the HTTP request automatically. The processing which adds the data "cookie_peer" to as the query parameter is ordered by a script file describing the processing of the Web application 412.

FIG. 15 is a diagram representing an example of the script file "sc" describing the processing of the Web application 412. The script file "sc" in FIG. 15 is downloaded as the Web application 412 by the server 10. The script file "sc" in the example of FIG. 15 has a description of HTML tag and JavaScript, for example.

The description "cd1" in FIG. 15 illustrates an example of the description of the processing which adds a query parameter to the img tag. The description "dc3" in the description "cd1" indicates a description to make the src of the img tag connect the query parameter "cookie_peer="variable cookie_peer"". In addition, the description "cd2" indicates the processing which inputs the value Nonce into the variable "cookie_peer". In an example of FIG. 15, the value Nonce is a random value including numbers or letters of ten several bytes. Therefore, the description "cd1" generates the img tag "<img src=https://fqdn/cell/box/image.jpg?cookie_peer="value Nonce"". In the example of FIG. 15, when a button is pushed down, the function load ( ) is called, and the img tag which is given the query parameter is generated. Accordingly, the HTTP request given the query parameter is generated.

FIG. 16 is a diagram representing an example of the HTTP request and the HTTP response of the certification demand. The HTTP request R1 in FIG. 16 is an example of the HTTP request of the certification demand that the client 30a transmits to the server 10 and corresponds to the HTTP request b11 in FIG. 9. The description "cd10" in the message body of HTTP request R1 depicted in FIG. 16 indicates a user ID and a password, and the description "cd11" indicates a set value instructing a return of the certification Cookie 11.

In addition, the HTTP response "R2" in FIG. 16 is an example of the response to the certification demand and corresponds to the HTTP response b12 in FIG. 9. As described in FIG. 9, the HTTP response "R2" includes the certification Cookie 11 having the data "cookie_peer" 12 and the encrypted certification token 13 and the encrypted data "cookie_peer" 12 and the certification token 13.

The letter "200 OK" of the request line in the HTTP response "R2" depicted in FIG. 16 indicates a normal end status to be concrete. In addition, the description "cd12" included in the message header of the HTTP response "R2" indicates the certification Cookie 11. In addition, the description "cd13" included in the message body indicates the data "cookie_peer" 12, and the description "cd14" indicates the certification token 13.

FIG. 17 is a diagram illustrating an example of the HTTP request and the HTTP response of the access demand of the resource. The HTTP request "R3" in FIG. 17 is an example of the HTTP request of the access demand that the client 30a transmits to the server 10 and corresponds to the HTTP request b13 in FIG. 9. As described in FIG. 9, the HTTP request is a request which requires moving image data "/fqdn/cell/box/movie.mp4" stored in the user's area RSD having the access restriction.

The HTTP request R3 in FIG. 17 includes the certification Cookie 11, and is appointed the data "cookie_peer" 12 as a query parameter. Especially, the description "cd15" included in the request line of the HTTP request R3 indicates the data "cookie_peer" 12 which is given as a query parameter. In addition, the description "cd16" in the message header of the HTTP request R3 indicates the certification Cookie 11. As described above, the certification Cookie 11 includes encrypted data "cookie_peer" 12 and encrypted certification token 13.

In addition, the HTTP response R4 depicted in FIG. 17 corresponds to the HTTP response b4 in FIG. 9. Especially, the letter "200 OK" in the request line of HTTP response R4 indicates a normal end status, and the message body "cd17" indicates the moving image data "/fqdn/cell/box/movie.mp4" appointed by the resource access demand of the HTTP request.

As described above, the service providing method according to the embodiment includes a transmission process that the information processing device (server) 10, when a certification succeeds in response to a certification demand of the session which is received from the client device (client) 30a, generates session relating data ("cookie_peer") 12 and generates cookie (certification Cookie) 11 relating to the certification including the data and transmits the cookie and the data to the client device. In addition, the service providing method has a reception process that the information processing device receives a service request and the cookie given data as a query parameter from the client device. In addition, the service providing method has a providing process which provides the service of the service request to the client device when the data included in the cookie matches with the data given as the query parameter.

In this way, the server 10 receives the certification Cookie including the data "cookie_peer" and the data "cookie peer" with a set and judges that a service request is fair when both of the data "cookie_peer" matches with. Even if the application that does not succeed for the certification plagiarized the certification Cookie of the application that succeeded for the certification, it is not possible that the application that does not succeed for the certification gives the data "cookie_peer" which is a pair of the data "cookie_peer" included in the certification Cookie to an HTTP request. Therefore, it is possible that the server 10 judges the HTTP request that the application that does not succeed in the certification sent as an unfair HTTP request.

In addition, the server 10 according to the embodiment does not have to manage the information for judging the data "cookie_peer". In other words, the server 10 does not have to manage the data "cookie_peer" of each session, because the data "cookie_peer" is compared with the information that is given in the same HTTP request. Therefore, it is possible that the server 10 judges a fair service request without an increase of the management cost even if the users increase.

In addition, because the data "cookie_peer" which is given as the query parameter is a meaningless data in the simple substance like a random number value called nonce, it is possible to restrain a risk of the security in a low level even if a query parameter was listened in.

In addition, the transmission process of the service providing method according to the embodiment includes a process to encrypt data and transmit the cookie including the data which is encrypted. In addition, the providing process includes a process to decrypt the data included in the cookie and a providing process to provide a service of the service request to the client device when the data given as the query parameter matches with the data which is decrypted. Because the data "cookie_peer" included in the certification Cookie is encrypted, it becomes hard to detect that the data "cookie_peer" which is a pair with the data given to a query parameter is included in the certification Cookie 11. Thereby, it is possible to raise a security level more.

In addition, according to the service providing method of the embodiment, the transmission process includes a process to generate a cookie including certification token 13 having the authority information in the service that the information processing device provides in addition to data. And the providing process includes a process to provide the service of the service request to the client device based on the authority information of the certification token included in the cookie when the data included in the cookie matches with the data given as the query parameter.

Thereby, it is possible that the server 10 acquires the certification token 13 based on the certification Cookie 11 even if the HTTP request is a request that the grant of the certification token is not possible. In addition, because the server does not judge that a request is a fair service request when both data do not match with, even if the certification Cookie 11 including certification token 13 are plagiarized, it is possible that the server evades that illegal access to a resource is performed based on the certification token 13.

In addition, the transmission process of the service providing method according to the embodiment includes a process to encrypt data and a certification token and to transmit a cookie including the encrypted data and encrypted certification token. Further, the providing process includes a process to decrypt the data and the certification token included in the cookie, and a process to provide the service of the service request to the client device based on the authority information of the certification token which is decrypted when the data given to a query parameter matches with the data which is decrypted. Because the certification token included in the certification Cookie is encrypted in addition to the data "cookie_peer", a security level raises more.

In addition, in the service providing method according to the embodiment, data, which is generated in the transmission process, are data having either or both of numbers and letters at random. Because the data "cookie_peer" is a meaningless data in the simple substance, it is possible to restrain a risk of the security in a low level even if the query parameter was listened in.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A service providing method, the method comprising:
generating, by an information processing device, data identifying a current session and a cookie relating to a certification of the current session established by the information processing device;
encrypting the data to obtain encrypted data;
including the encrypted data in the cookie when the certification is successful in response to a certification request of the current session received from a client device;
transmitting, by the information processing device, the cookie, including the encrypted data, to the client device;
receiving, by the information processing device, an HTTP request which is given the data as a query parameter and the cookie from the client device;
decrypting the encrypted data included in the cookie to obtain decrypted data; and
providing, by the information processing device, a service of the HTTP request to the client device when the HTTP request is a content transmission request not granting the certification token in the Authorization header of the HTTP request and when the decrypted data, decrypted from the encrypted data included in the cookie, matches with the data which is given as the query parameter.

2. The service providing method according to claim 1, wherein
the transmitting comprises generating the cookie including a certification token having an authority information of the service which the information processing device provides in addition to the data, and
the providing comprises providing the service of the HTTP request to the client device based on the authority information of the certification token included in the cookie when the data included in the cookie matches with the data which is given as the query parameter.

3. The service providing method according to claim 2, wherein the transmitting comprises:
encrypting the data and the certification token; and
transmitting the cookie including the data which is encrypted and the certification token which is encrypted, and wherein the providing comprises:
decrypting the data and the certification token included in the cookie; and
providing the service of the HTTP request to the client device based on the authority information of the certification token which is decrypted when the data which is given as the query parameter matches with the data which is decrypted.

4. The service providing method according to claim 1, wherein the data which is generated in the generating includes data either or both of number and letter at random.

5. The service providing method according to claim 1, wherein the method further comprises:
storing, by a Web browser which is executed by the client device, the cookie in a first memory area that the Web browser accesses; and
storing, by an application which operates via the Web browser and transmits the certification request, the data which is received in a second memory area which is used by the application and is released according to an end of the application.

6. The service providing method according to claim 1, wherein the transmission request is a request based on a HTML tag.

7. A service requesting method performed by a client device communicating with an information processing device, the method comprising:
receiving, by an application which operates via a Web browser on the client device, from the information processing device, data identifying a current session and a cookie relating to a certification of the current session established by the information processing device, including encrypted data obtained by encrypting the data, in response to a certification request transmitted to the information processing device by the application;
storing, by the Web browser on the client device, the cookie in a first memory area that the Web browser accesses;
storing, by the application on the client device which transmits the certification request, the data which is received in a second memory area which is used by the application and is released according to an end of the application; and
transmitting from the client device, by the Web browser, an HTTP request containing a content transmission request not granting the certification token in the Authorization header of the HTTP request, the data as a query parameter and the cookie, including the encrypted data, to the information processing device.

8. An information processing device communicating with a client device, comprising:
a memory to store information targeted for an HTTP request; and
a processor coupled to the memory and configured to execute a process including;
generating data identifying a current session and a cookie relating to a certification of the current session, including the data when the certification is successful in response to a certification request of the current session received from the client device,
encrypting the data to obtain encrypted data,
transmitting the cookie, including the encrypted data, to the client device,
receiving the HTTP request which is given the data as a query parameter and the cookie from the client device, decrypting the encrypted data included in the cookie to obtain decrypted data, and providing a service of the HTTP request to the client device when the HTTP request is a content transmission request not granting the certification token in the Authorization header of the HTTP request and when the decrypted data, decrypted from the encrypted data included in the cookie, matches with the data which is given as the query parameter.

9. The information processing device according to claim 8, wherein the processor encrypts the data when the certification is successful, transmits the cookie including the data which is encrypted, decrypts the data included in the cookie when receiving the HTTP request and the cookie, and provides the service of the HTTP request to the client device when the data which is given as the query parameter matches with the data which is decrypted.

10. The information processing device according to claim 8, wherein the processor generates the cookie including a certification token having an authority information of the service which the information processing device provides in addition to the data when the certification is successful, and provides the service of the HTTP request to the client device based on the authority information of the certification token included in the cookie when the data included in the cookie that is received matches with the data which is given as the query parameter.

11. A client device communicating with an information processing device, comprising:

a processor that executes a Web browser and an application; and a memory coupled to the processor including:
a first memory area that the Web browser accesses; and
a second memory area that is used by the application which operates via the Web browser and is released according to an end of the application, and wherein the processor is configured to execute a process including
receiving data relating to a current session established by the information processing device and a cookie relating to a certification of the current session, including encrypted data obtained by encrypting the data, in response to a successful certification request that the application transmitted to the information processing device,
storing the cookie in the first memory area,
storing the data which is received in the second memory area, and
transmitting an HTTP request containing a content transmission request not granting the certification token in the Authorization header of the HTTP request, the data as a query parameter and the cookie, including the encrypted data, to the information processing device.

* * * * *